United States Patent
Jackson et al.

(10) Patent No.: US 12,515,718 B2
(45) Date of Patent: Jan. 6, 2026

(54) SYSTEMS AND METHODS FOR MONITORING AND VALIDATING STATUS OF RETARDER DEVICES

(71) Applicant: BNSF Railway Company, Fort Worth, TX (US)

(72) Inventors: Nicholas E. Jackson, Haslet, TX (US); Nathaniel W. Merry, Kansas City, MO (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 18/658,678

(22) Filed: May 8, 2024

(65) Prior Publication Data
US 2025/0346264 A1    Nov. 13, 2025

Related U.S. Application Data

(63) Continuation-in-part of application No. 18/658,386, filed on May 8, 2024.

(51) Int. Cl.
*B61L 15/00* (2006.01)

(52) U.S. Cl.
CPC ....... *B61L 15/0081* (2013.01); *B61L 15/0072* (2013.01)

(58) Field of Classification Search
CPC .......................... B61L 15/0081; B61L 15/0072
See application file for complete search history.

(56) References Cited

U.S. PATENT DOCUMENTS

| 3,601,605 A * | 8/1971 | Elder ...................... B61L 3/121 |
| | | 246/182 R |
| 3,745,334 A | 7/1973 | Wong et al. |
| 4,151,969 A * | 5/1979 | Wood ...................... B61L 17/00 |
| | | 246/182 A |

(Continued)

FOREIGN PATENT DOCUMENTS

| EP | 3745334 A1 | 2/2024 |
| GE | 940060 A1 | 11/1995 |
| WO | 2004110845 A1 | 12/2004 |

OTHER PUBLICATIONS

Hongfei Li, et al., Improving rail network velocity: A machine learning approach to predictive maintenance, Aug. 1, 2014.

(Continued)

*Primary Examiner* — Long T Tran
(74) *Attorney, Agent, or Firm* — Whitaker Chalk Swindle & Schwartz PLLC; Enrique Sanchez, Jr.

(57) ABSTRACT

Methods and systems for determining a status of retarder devices in a classification yard. In particular embodiments, a set of car event data associated with a retarder may be analyzed to determine the ability of the retarder to efficiently remove energy from cuts traveling over the retarder throughout the length of the retarder. A status of the retarder may be determined from analysis of the ability of the retarder to efficiently remove energy from cuts traveling over the retarder throughout the length of the retarder. In embodiments, the status of the retarder may be used to ensure corrective actions on the retarder (e.g., deploy maintenance personnel, report the status of the retarder, send a control signal to the retarder to deactivate, etc.).

20 Claims, 6 Drawing Sheets

(56) References Cited

U.S. PATENT DOCUMENTS

| | | | |
|---|---|---|---|
| 6,216,525 B1 * | 4/2001 | Bernd | B61K 7/025 73/11.06 |
| 8,499,900 B1 * | 8/2013 | Heyden | B61K 7/02 188/62 |
| 8,560,151 B2 | 10/2013 | Armitage et al. | |
| 8,655,540 B2 | 2/2014 | Mian et al. | |
| 9,415,513 B2 | 8/2016 | Tian et al. | |
| 9,714,043 B2 | 7/2017 | Mian et al. | |
| 9,945,652 B2 | 4/2018 | Mian et al. | |
| 10,597,053 B2 | 3/2020 | Mian et al. | |
| 10,906,571 B2 | 2/2021 | Mian | |
| 2007/0106434 A1 | 5/2007 | Galbraith et al. | |
| 2007/0298570 A1 * | 12/2007 | Parekh | H10B 41/43 257/E21.619 |
| 2008/0119973 A1 * | 5/2008 | Pathak | B61L 17/00 701/19 |
| 2008/0173771 A1 | 7/2008 | Kiss et al. | |
| 2008/0304065 A1 * | 12/2008 | Hesser | E01B 35/00 356/400 |
| 2014/0137762 A1 * | 5/2014 | Dierkes | B61K 7/02 104/26.2 |
| 2023/0303136 A1 * | 9/2023 | Braatz | F16D 65/78 |
| 2023/0331265 A1 * | 10/2023 | Braatz | B61K 7/12 |
| 2024/0308555 A1 * | 9/2024 | Malde | B61L 7/06 |
| 2024/0317285 A1 * | 9/2024 | Malde | B61L 17/00 |

OTHER PUBLICATIONS

Weixin Wang, et al., Joint Prediction of remaining useful life and failure type of train wheelsets: a multi-task learning approach, Jan. 10, 2021.

Zaharah Allah Bukhsh, et al., Predictive maintenance using tree-based classification techniques: A case of railway switches, Apr. 1, 2019.

* cited by examiner

Retarder Status Report

| | | | | | | |
|---|---|---|---|---|---|---|
| Retarder Failure Count | 2 | | | | | |
| Section Warning Count | 4 | | | | | |

| ID | | | | | |
|---|---|---|---|---|---|
| RTM0348 SEC 1 | 80% 6000 | | | | |
| SEC 2 | | | | | |
| SEC 3 | | 6500 7000 | | | |
| RTG0508 SEC 1 | 52% 11000 | | | | |
| SEC 2 | | 6500 | | | |
| RTG2916 SEC 1 | 86% 6000 | | | | |
| SEC 2 | | 6500 | | | |
| RTG1724 SEC 1 | N/A 6000 | | | | |
| SEC 2 | | 6500 | | | |
| RTG2532 SEC 1 | 64% 6000 | | | | |
| SEC 2 | | 6500 | | | |
| RTG3340 SEC 1 | | 6000 | | | |
| SEC 2 | | 6500 | | | |
| RTG4148 SEC 1 | 80% 6000 | | | | |
| SEC 2 | | 13000 | | | |
| RTT2001 SEC 1 | 80% 6000 | | | | |
| RTT2002 SEC 1 | | 6000 | | | |
| RTT2003 SEC 1 | 80% 6000 | | | | |
| RTT2004 SEC 1 | 88% 6000 | | | | |
| RTT2005 SEC 1 | 64% 10000 | | | | |
| RTT2006 SEC 1 | 80% 6000 | | | | |
| RTT2007 SEC 1 | 56% 6000 | | | | |
| RTT2008 SEC 1 | 80% 6000 | | | | |
| RTT2009 SEC 1 | 80% 10000 | | | | |
| RTT2010 SEC 1 | 71% 6000 | | | | |
| RTT2011 SEC 1 | 65% 6000 | | | | |
| RTT2012 SEC 1 | 80% 6000 | | | | |

SYSTEMS AND METHODS FOR MONITORING AND VALIDATING STATUS OF RETARDER DEVICES

CROSS-REFERENCE TO RELATED APPLICATIONS

The present application is a Continuation-in-Part of U.S. patent application Ser. No. 18/658,386, filed on May 8, 2024, the entirety of which is herein incorporated by reference for all purposes.

TECHNICAL FIELD

The present invention relates generally to maintenance monitoring systems, and more particularly to tools for monitoring and validating the status of retarder devices in a classification yard.

BACKGROUND

Innovation in the railroad industry has allowed for widespread and efficient transportation of freight and passengers across distances using trains. A typical train may include one or more locomotive engines that may be configured to pull and/or push one or more train cars. The trains may be put together or assembled in a classification yard, which may include a hump yard. A hump yard may refer to an area configured to route the train cars along a network of marshalling tracks using gravity to respectively-assigned trains. In this manner, the hump yard may enable operators to assemble trains by routing the train cars to their assigned train. Typically, hump yards consist of an elevated area (e.g., a hump, which may be artificial or natural, such as a hill, mound, etc.) along which a track section is run. The track section may include an approach section, a top of the hump or crest, and a release area, which typically branches out into multiple marshalling tracks. Each of the marshalling tracks may eventually lead to a destination train to which the various train cars may be routed using the marshalling tracks.

In typical operations of a hump yard, a rolling stock train including the train cars to be marshalled to their assigned train may be pushed by a hump push engine at a set speed along the approach section to the crest of the hump. As the train cars roll past the apex (e.g., the crest) of the hump, gravity may begin pulling the railroad cars towards the bottom of the hump causing individual railroad cars, or groups of railroad cars, also referred to as a cut, to separate from the stock train and to coast to the release area at a release speed. The separated railroad cars, or cut, may coast (and may decelerate or accelerate depending on the layout of the marshalling tracks) through the marshalling tracks to reach the coupling point at their respectively assigned train. The operations continue with additional cuts being routed through the hump yard marshalling tracks as appropriate or necessary. Once the train is fully assembled, the train is pulled out of the marshalling tracks and eventually travels to its destination.

In a hump yard, controlling the movement of a cut as it travels through the marshalling tracks is exceedingly important. For example, controlling the route of each cut is important to ensure that each cut is routed to the respectively assigned destination train, to avoid potential collisions between the various cuts, and/or to load-balance the use of the marshalling tracks as the cuts are released onto the marshalling tracks.

Additionally, controlling the speed of each cut as it travels through the marshalling tracks is important in order to avoid accidental damage to equipment, train cars, and/or the freight itself. For example, an overly high coupling speed may cause the cut to couple with the destination train at a high speed and may cause damage to the existing train cars (e.g., the train cars already coupled to the destination train), to itself, or to the freight (e.g., the freight being carried by one or more of the train cars in the cut or the freight in the existing train cars of the destination train), whereas an overly low release speed may not be sufficient to ensure that the cut reaches the coupling point, as the only source of power to the cut during the marshalling process is gravity and as such, the cut is not able to accelerate beyond what gravity provides. In addition, controlling the speed of each cut as it travels through the marshalling tracks is important to ensure that the separation between the various cuts is sufficient to avoid collisions between cuts. Ensuring an appropriate separation between cuts may also ensure that any switches in the route of the cuts may be reset in time to marshal the next cut to the appropriate train. For example, if two consecutive cuts assigned to different marshalling tracks are released from the top of the hump too close together, there may not be sufficient time to reset the switch after the first cut is diverted to its respective marshalling track to ensure that the second cut is diverted to the appropriate marshalling track.

In typical implementations of a classification yard, various mechanisms and devices are implemented to control the route and/or speed of the various cuts as these various cuts travel through the marshalling tracks of the classification yard. Typical implementations include switches that may be configured to route a cut to a target track, detectors that may be configured to detect the speed of a cut, and/or retarders that may be configured to remove energy from a cut. A typical switch operates by routing a cut from a source track into one of a plurality of destination tracks. For example, a switch may be connected to a single source track and a plurality of destination tracks. A signal may be configured the throw the switch to a selected track of the plurality of destination tracks, in which case a cut traveling over the source track may be automatically routed to the selected destination track. A typical detector may be configured to detect a speed of a cut by detecting the presence of a first wheel of the cut at a first time, detecting the presence of a second wheel of the cut at a second time, and determining a speed from the difference between the first and second times over the distance between the first wheel and the second wheel. In this manner, a detector may be used to measure the speed of a cut.

A typical retarder may be configured to remove energy from a cut traveling through the retarder. Removing energy from a cut may have the effect of slowing down the cut, which is why a retarder may be thought of as removing speed from a cut. A retarder may remove energy from a cut by applying a pressure against one or more wheels of the cut (e.g., using a braking element, such as a brake pad, etc.), which may cause the cut to slow down. Put another way, the retarder may remove energy (e.g., potential energy) of the train car as it moves through a marshalling track, which may cause the train car to slow down. The amount of energy, or speed, removed from a cut by a retarder may depend on the amount of pressure applied by the retarder. For example, a higher pressure may cause more energy, or speed, to be removed from a cut than a lower pressure. In this manner, retarders may be used to further control the speed of a cut as it travels through the marshalling tracks.

In typical retarder operations, an exit speed is requested of the retarder for a cut. In this manner, the retarder may operate to remove energy, as necessary, to ensure that the cut exits the retarder (e.g., at the exit point of the retarder) at the requested exit speed. The amount of energy to be removed by the retarder from the cut to meet the requested exit speed may depend on the speed of the cut at the entry point of the retarder.

However, retarders wear down over time and as a result, may not be able to remove energy as efficiently as before. For example, as a retarder wears down, the same amount of pressure applied to a cut may not be able to remove the same amount of energy over time. In this case, even with the same pressure applied to a cut, the cut may not slow down as much as before. As a result, classification yard operations may not be as efficient because a retarder may not be able to remove an amount of energy requested.

Currently, retarders may be manually inspected to determine their status. However, this presents a great burden on operators, and may become very expensive due to the number of retarders used. In some cases, software tools may be used to determine the status of a retarder. However, current tools may not be able to effectively determine the status of a retarder. In particular, current tools may not be able to identify the degradation of a retarder even when the retarder may remove the requested energy, but the removal may not be as effective as previously. In this case, current tools may not be able to determine the ability of a retarder to control the speed of a cut through the retarder to reach the desired exit speed efficiently.

SUMMARY

The present disclosure achieves technical advantages as systems, methods, and computer-readable storage media that provide functionality for determining a status of retarder devices in a classification yard. In particular embodiments, a set of car event data associated with a retarder may be analyzed to determine the ability of the retarder to efficiently remove energy from cuts traveling over the retarder throughout the length of the retarder. A status of the retarder may be determined from analysis of the ability of the retarder to efficiently remove energy from cuts traveling over the retarder throughout the length of the retarder. In embodiments, the status of the retarder may be used to ensure corrective actions on the retarder (e.g., deploy maintenance personnel, report the status of the retarder, send a control signal to the retarder to deactivate, etc.).

The present disclosure provides for a system integrated into a practical application with meaningful limitations as a system with functionality for determining a status of retarder devices that is used for controlling operations of a classification yard. In embodiments, determining the status of retarder devices may be critical to operations in a classification yard, as retarders, by their very design, are meant to wear down over time as cuts are slowed down using friction by the retarders. As the retarders wear down, the retarders may not be able to remove as much energy using the same amount of pressure as before the wear down. In some cases, predictions and/or control signals to the retarder may not be effective, as the wear down of the retarders may not be known, which may cause operational problems. In addition, in some cases, the degradation of a retarder may be masked by control software, which may control the retarder to apply more pressure when a requested exit speed is in danger of not being reached. In these cases, it may appear that the retarder may be operating properly, since the requested exit speed was reached, but in reality, there may be issues with the retarder that were compensated for by the control software. The present disclosure provides features that may be used by a system to monitor, track, and/or control the ability of a retarder to operate efficiently and effectively to control a speed of a cut speed within the retarder to a requested exit speed. In embodiments, features described herein may allow a system to generate alert and/or control signals that may be used by field personnel to perform corrective actions on the retarder or may be used by the system to send automatic control signals to deactivate a defective or degraded retarder.

The present disclosure solves the technological problem of a lack of functionality in current systems to dynamically monitor, track, and/or control the ability of a retarder to operate efficiently and effectively to control a speed of a cut speed within the retarder to a requested exit speed. For example, in current systems, a bad or degraded retarder may not be identified until it is too late (e.g., after is has failed), which may result in catastrophic (e.g., may cause injury to persons, damage to equipment, and/or impact to services) and/or expensive consequences. In a particular case, as mentioned above, control software may compensate for a degraded retarder, which may mask a retarder that may be going bad (e.g., may have one or more bad retarder sections). A system implemented in accordance with the present disclosure may be flexible and responsive to these situations may identify these bad/defective retarders, even when the problem may be masked by control software compensating. The technological solutions provided herein, and missing from conventional systems, are more than a mere application of a manual process to a computerized environment, but rather include functionality to implement a technical process to replace or supplement current manual solutions or non-existing solutions for determining the status of retarders. In doing so, the present disclosure goes well beyond a mere application of the manual process to a computer. Accordingly, the claims herein necessarily provide a technological solution that overcomes a technological problem.

It is further noted that the embodiments described herein focus and/or are described in the context of operations of a classification yard. However, this is not intended to be limiting, as the techniques disclosed herein are also applicable in other railroad operations that may not involve a classification yard. For example, the techniques disclosed herein may be used to determine a status of hardware devices that are used for controlling railroad operations that may not be part of a classification yard. In this case, the embodiments herein should be construed as exemplary, and not limiting in any way. Moreover, although specific and particular hardware devices may be described herein, this is also not intended to be limiting, and it should be understood that the techniques disclosed herein to determine a status of hardware devices may be used to determine that status of any hardware device that may be used in any operation related to hardware (and not limited to classification yard operations of specific devices mentioned herein).

In various embodiments, the system comprises one or more processors interconnected with a memory module, capable of executing machine-readable instructions. These instructions include, but are not limited to, the steps outlined in any flow diagram, system diagram, block diagram, and/or process diagram disclosed herein, as well as steps corresponding to any functionality detailed herein. In embodiments, the execution of these machine-readable instructions may involve initiating multiple concurrent computer processes. Each process of the concurrent computer process may be configured to handle or process a designated subset or portion of the of the machine-readable instructions. This division of tasks enables parallel processing, multi-processing, and/or multi-threading, enabling multiple operations to be conducted or executed concurrently rather than sequentially. This functionality for spawning a plurality of concurrent processes to manage separate portions of the machine-readable instructions markedly increases the overall speed of execution of the machine-readable instructions. By leveraging parallel or concurrent processing, the time required to complete a set or subset of program steps is substantially reduced (e.g., when compared to execution without concurrent or parallel processing). This efficiency gain not only accelerates the processing speed but also optimizes the use of processor resources, leading to an improved performance of the computing system. This enhancement in computational efficiency constitutes a significant technological improvement, as it enhances the functional capabilities of the processors and the system as a whole, representing a practical and tangible technological advancement. The result of this concurrent processing functionality results in an improvement in the functioning of the one or more processor and/or the computing system, and thus, represents a practical application.

In embodiments, the present disclosure includes techniques for training models (e.g., machine-learning models, artificial intelligence models, algorithmic constructs, etc.) for performing or executing a designated task or a series of tasks (e.g., one or more features of steps or tasks of processes, systems, and/or methods disclosed in the present disclosure). The disclosed techniques provide a systematic approach for the training of such models to enhance performance, accuracy, and efficiency in their respective applications. In embodiments, the techniques for training the models may include collecting a set of data from a database, conditioning the set of data to generate a set of conditioned data, and/or generating a set of training data including the collected set of data and/or the conditioned set of data. In embodiments, that model may undergo a training phase wherein the model may be exposed to the set of training data, such as through an iterative processes of learning in which the model adjusts and optimizes its parameters and algorithms to improve its performance on the designated task or series of tasks. This training phase may configure the model to develop the capability to perform its intended function with a high degree of accuracy and efficiency. In embodiments, the conditioning of the set of data may include modification, transformation, and/or the application of targeted algorithms to prepare the data for training. The conditioning step may be configured to ensure that the set of data is in an optimal state for training the model, resulting in an enhancement of the effectiveness of the model's learning process. These features and techniques not only qualify as patent-eligible features but also introduce substantial improvements to the field of computational modeling. These features are not merely theoretical but represent an integration of a concepts into a practical application that significantly enhance the functionality, reliability, and efficiency of the models developed through these processes.

In embodiments, the present disclosure includes techniques for generating a notification of an event that includes generating an alert that includes information specifying the location of a source of data associated with the event, formatting the alert into data structured according to an information format, and/or transmitting the formatted alert over a network to a device associated with a receiver based upon a destination address and a transmission schedule. In embodiments, receiving the alert enables a connection from the device associated with the receiver to the data source over the network when the device is connected to the source to retrieve the data associated with the event and causes a viewer application (e.g., a graphical user interface (GUI)) to be activated to display the data associated with the event. These features represent patent eligible features, as these features amount to significantly more than an abstract idea. These features, when considered as an ordered combination, amount to significantly more than simply organizing and comparing data. The features address the Internet-centric challenge of alerting a receiver with time sensitive information. This is addressed by transmitting the alert over a network to activate the viewer application, which enables the connection of the device of the receiver to the source over the network to retrieve the data associated with the event. These are meaningful limitations that add more than generally linking the use of an abstract idea (e.g., the general concept of organizing and comparing data) to the Internet, because they solve an Internet-centric problem with a solution that is necessarily rooted in computer technology. These features, when taken as an ordered combination, provide unconventional steps that confine the abstract idea to a particular useful application. Therefore, these features represent patent eligible subject matter.

In embodiments, one or more operations and/or functionality of components described herein can be distributed across a plurality of computing systems (e.g., personal computers (PCs), user devices, servers, processors, etc.), such as by implementing the operations over a plurality of computing systems. This distribution can be configured to facilitate the optimal load balancing of traffic (e.g., requests, responses, notifications, etc.), which can encompass a wide spectrum of network traffic or data transactions. By leveraging a distributed operational framework, a system implemented in accordance with embodiments of the present disclosure can effectively manage and mitigate potential bottlenecks, ensuring equitable processing distribution and preventing any single device from shouldering an excessive burden. This load balancing approach significantly enhances the overall responsiveness and efficiency of the network, markedly reducing the risk of system overload and ensuring continuous operational uptime. The technical advantages of this distributed load balancing can extend beyond mere efficiency improvements. It introduces a higher degree of fault tolerance within the network, where the failure of a single component does not precipitate a systemic collapse, markedly enhancing system reliability. Additionally, this distributed configuration promotes a dynamic scalability feature, enabling the system to adapt to varying levels of demand without necessitating substantial infrastructural modifications. The integration of advanced algorithmic strategies for traffic distribution and resource allocation can further refine the load balancing process, ensuring that computational resources are utilized with optimal efficiency and that data flow is maintained at an optimal pace, regardless of the volume or complexity of the requests being processed. Moreover, the practical application of these disclosed features represents a significant technical improvement over traditional centralized systems. Through the integration of the disclosed technology into existing networks, entities can achieve a superior level of service quality, with minimized latency, increased throughput, and enhanced data integrity. The distributed approach of embodiments can not only bolster the operational capacity of computing networks but can also offer a robust framework for the development of future technologies, underscoring its value as a foundational advancement in the field of network computing.

To aid in the load balancing, the computing system of embodiments of the present disclosure can spawn multiple processes and threads to process data traffic concurrently. The speed and efficiency of the computing system can be greatly improved by instantiating more than one process or thread to implement the claimed functionality. However, one skilled in the art of programming will appreciate that use of a single process or thread can also be utilized and is within the scope of the present disclosure.

It is an object of the disclosure to provide a system for determining a status of retarder devices in a classification yard. It is a further object of the disclosure to provide a method of determining a status of retarder devices in a classification yard, and a computer-based tool for determining a status of retarder devices in a classification yard. These and other objects are provided by the present disclosure, including at least the following embodiments.

In one particular embodiment, a method of determining a status of retarder devices in a classification yard is provided. The method includes compiling a plurality of car events associated with a retarder device in classification yard. In embodiments, each car event of the plurality of car events is associated with a requested exit speed of a cut and includes real-world measurements of an actual exit speed at the retarder device during each car event of the plurality of car events and/or an indication of an energy removal performance of the retarder device during each car event of the plurality of car events. In embodiments, the energy removal performance of the retarder device during a car event may indicate an amount of utilization of the retarder used to remove an amount of speed from the cut. The method also includes generating a set of deviation metrics associated with the retarder device based on the plurality of car events associated with the retarder device, applying thresholding analysis to the set of deviation metrics associated with the retarder to determine a status of the retarder device, and generating a corrective action signal including an indication of the status of the retarder device, and/or a corrective action to be taken for the retarder device.

In another embodiment, a system for determining a status of retarder devices in a classification yard is provided. The system comprises at least one processor and a memory operably coupled to the at least one processor and storing processor-readable code that, when executed by the at least one processor, is configured to perform operations. The operations include compiling a plurality of car events associated with a retarder device in classification yard. In embodiments, each car event of the plurality of car events is associated with a requested exit speed of a cut and includes real-world measurements of an actual exit speed at the retarder device during each car event of the plurality of car events and/or an indication of an energy removal performance of the retarder device during each car event of the plurality of car events. In embodiments, the energy removal performance of the retarder device during a car event may indicate an amount of utilization of the retarder used to remove an amount of speed from the cut. The operations also include generating a set of deviation metrics associated with the retarder device based on the plurality of car events associated with the retarder device, applying thresholding analysis to the set of deviation metrics associated with the retarder to determine a status of the retarder device, and generating a corrective action signal including an indication of the status of the retarder device, and/or a corrective action to be taken for the retarder device.

In yet another embodiment, a computer-based tool for determining a status of retarder devices in a classification yard is provided. The computer-based tool including non-transitory computer readable media having stored thereon computer code which, when executed by a processor, causes a computing device to perform operations. The operations include compiling a plurality of car events associated with a retarder device in classification yard. In embodiments, each car event of the plurality of car events is associated with a requested exit speed of a cut and includes real-world measurements of an actual exit speed at the retarder device during each car event of the plurality of car events and/or an indication of an energy removal performance of the retarder device during each car event of the plurality of car events. In embodiments, the energy removal performance of the retarder device during a car event may indicate an amount of utilization of the retarder used to remove an amount of speed from the cut. The operations also include generating a set of deviation metrics associated with the retarder device based on the plurality of car events associated with the retarder device, applying thresholding analysis to the set of deviation metrics associated with the retarder to determine a status of the retarder device, and generating a corrective action signal including an indication of the status of the retarder device, and/or a corrective action to be taken for the retarder device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 4 illustrates an example of a user interface presented to an operator to provide a status report associated with one or more retarders in accordance with aspects of the present disclosure.

Figure 1:
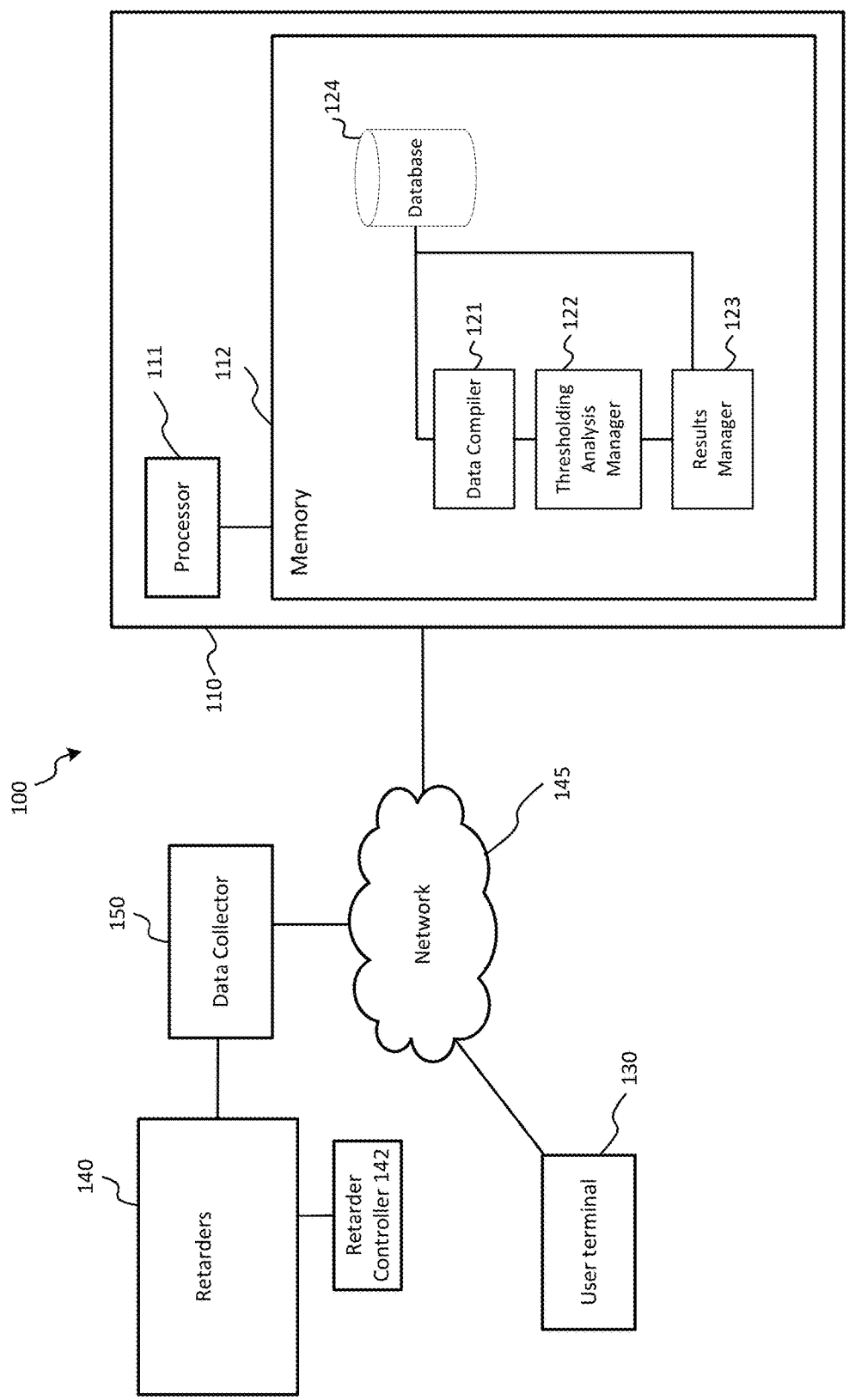
FIG. 1 is a block diagram of an exemplary system configured with capabilities and functionality for determining a status of retarder devices in a classification yard in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, the issuance of this patent is evidence that: the elements and limitations presented in the claims are enabled by the specification and drawings, the issued claims are directed toward patent-eligible subject matter, and the prior art fails to disclose or teach the claims as a whole, such that the issued claims of this patent are patentable under the applicable laws and rules of this country.

Various embodiments of the present disclosure are directed to systems and techniques that provide functionality for determining a status of retarder devices in a classification yard. In particular embodiments, a set of car event data associated with a retarder may be analyzed to determine the ability of the retarder to efficiently remove energy from cuts traveling over the retarder throughout the length of the retarder. A status of the retarder may be determined from analysis of the ability of the retarder to efficiently remove energy from cuts traveling over the retarder throughout the length of the retarder. In embodiments, the status of the retarder may be used to ensure corrective actions on the retarder (e.g., deploy maintenance personnel, report the status of the retarder, send a control signal to the retarder to deactivate, etc.).

FIG. 1 is a block diagram of an exemplary system 100 configured with capabilities and functionality for determining a status of retarder devices in a classification yard in accordance with embodiments of the present disclosure. As shown in FIG. 1, system 100 may include server 110, retarders 140, retarder controller 142, data collector 150, user terminal 130, and network 145. These components, and their individual components, may cooperatively operate to provide functionality in accordance with the discussion herein. For example, in operation according to embodiments, retarders 140 may operate to remove energy from cuts traveling through retarders 140. For example, for each of a plurality of cuts traveling through retarders 140, retarders 140 may receive a requested exit speed. In embodiments, retarders 140 may operate to ensure that the exit speed of each of the plurality of cuts (e.g., the speed at the exit point of retarders 140) is the requested exit speed, or as close to the exit speed as possible. In embodiments, data collector 150 may operate to collect real-world car event data associated with the plurality of cuts traveling through retarders 140. For example, a car event may be generated for each cut passing through retarders 140. In this manner, a car event may represent a cut passing through retarders 140. In some embodiments, retarders 140 may include more than one retarder device, in which case a car event may represent a cut passing through a single retarder device of retarders 140. In embodiments, a car event may include real-world measurements associated with the cut passing through a retarder, and may include a measured exit speed (e.g., the actual exit speed of the cut at the exit point of the retarder), an entry speed (e.g., the actual speed of the cut at the entry point of the retarder), a requested exit speed (e.g., the exit speed requested for the cut associated with the car event), an amount of pressure applied by the retarder against the wheels of the cut to remove an amount of energy necessary to reach the requested exit speed, a distribution of the amount of pressure applied by the retarder at each section of the retarder, a speed of the cut at each of the sections of the retarder, an identification of the cut associated with the car event, an identification of the retarder for which the car event was generated, and/or other conditions associated with the car event (e.g., weather, type of train cars in the cut, type of bearings of the cut, identification of the cut, etc.).

In embodiments, functionality of server 110 may provide for determining, based on car events associated with a retarder, a status of the retarder. In embodiments, server 110 may include functionality for determining, based on car events associated with a retarder, a status of the retarder by compiling data related to car events associated with the retarder, applying threshold analysis to the compiled data to determine a relationship between real-world measurements and expected (e.g., predicted or desired) results with respect to energy removal by the retarder throughout the length of the retarder, to determine a status of the retarder based on the thresholding analysis, and to generate a corrective action signal in response to the determination of the status of the retarder. In embodiments, the thresholding analysis may include determining for each car event associated with a retarder an exit speed difference, which may include a difference between the requested exit speed and the actual exit speed (e.g., actual exit speed-requested exit speed), and analyzing the relationship of the exit speed differences against thresholds to determine the status of the retarder. In embodiments, a negative exit speed difference may indicate that the actual speed is lower than the requested exit speed, and a positive exit speed difference may indicate that the actual speed is greater than the requested exit speed. In some embodiments, the thresholding analysis may include determining for each car event associated with a retarder a utilization per energy change metric, and analyzing the relationship of the utilization per energy change metrics against thresholds to determine the status of the retarder.

It is noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally, or alternatively, when implemented in software, one or more of the functional blocks, or some portion thereof, may comprise code segments operable upon a processor to provide logic for performing the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such embodiments, the functionality of each respective component may be aggregated from the functionality of multiple modules residing in a single, or in multiple devices.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a cloud-based environment accessible over a network, such as one of network 145.

As noted above, in typical operations of a classification yard, such as a hump yard, a stock train that includes train cars to be marshalled to their assigned train may be pushed by a hump push engine at a set speed along the approach section of the hump to the crest of the hump. As the train cars roll past the hump crest, gravity may begin pulling the train cars towards the bottom of the hump. In embodiments, the train cars are "cut" from the stock train and the cut is allowed to roll down the hump and is marshalled to the destination train. Ensuring that the cut reaches the assigned destination train at the appropriate coupling speed is very important. As such, in embodiments, a cut may be tracked and controlled as the cut moves along the marshalling tracks of the classification yard. In particular, the route and the speed of the cut from the hump to its destination track or train may be controlled using various components of the classification yard. For example, classification yard may implement switches, detectors, and retarders, among other components. In embodiments, the cooperative operation of the various components of the classification yard may enable the classification yard to ensure that various cuts traverse the marshalling tracks and arrive at the destination coupling point at the appropriate coupling speed.

Retarders 140 may include one or more retarders configured with functionality to remove energy from a cut traveling through the one or more retarders. In embodiments, retarders 140 may be configured to remove energy from a cut traveling through retarders 140 by causing the cut to slow down as it travels, or passes, through or over retarders 140. In some embodiments, retarders 140 may cause a cut to slow down by applying a pressure against one or more wheels of one or more train cars included in the cut, which may cause the cut to slow down. For example, retarders 140 may press a braking element (e.g., a brake pad, etc.) against one or more wheels of one or more train cars included in the cut causing the cut to slow down. In embodiments, the amount of energy, or speed, removed from a cut by a retarder (e.g., one or more retarders of retarders 140) may depend on the amount of pressure applied by the retarder against one or more wheels of one or more train cars included in the cut. For example, a higher applied pressure may cause more energy, or speed, to be removed from a cut than a lower applied pressure. In this manner, as the energy of a cut is related to the speed of the cut, retarders 140 may operate to remove energy from a cut passing through it.

In embodiments, retarders 140 may span a length, and may include an entry point and an exit point. A cut passing through a retarder may first enter the retarder at the entry point, may travel the length of the retarder, and may then exit the retarder at the exit point. In embodiments, the speed of the cut may be measured at the entry point, at various points along the length of the retarder, and/or at the exit point of the retarder. In embodiments, a retarder may be configured to operate to remove energy from a cut in order to reach a requested exit speed for the cut. For example, during operation, a retarder may receive a request to remove an amount of energy from a cut scheduled to pass through it. In embodiments, the request may include a requested exit speed at which the cut is requested to exit the retarder. In these embodiments, the retarder may slow down the cut, as the cut passes through the retarder, in a manner that ensures that the cut exits the retarder at, or as close as possible to, the requested exit speed.

In some embodiments, a retarder may include multiple retarder sections, the sum of which may span the length of the retarder. During operation, as a cut passes through the retarder, each section of the retarder may remove some energy from the cut to slow down the cut by a certain amount of speed. The amount of energy removed from the cut by each section of the retarder may depend on the amount of pressure applied against the cut by each individual section. In this case, the sum of the amounts of energy removed by each section of the retarder individually may represent the total amount of energy removed by the retarder from the cut.

In embodiments, operation of retarders 140 to remove energy from a cut may be controlled by a retarder controller, such as retarder controller 142. Retarder controller 142 may include software, firmware, etc., configured to control the operations of retarder 140. In embodiments, retarder controller 142 may be configured to determine, based on a requested exit speed for a retarder, an amount of pressure to be applied by the retarder against the cut, including the amount of pressure to be applied by each individual section of the retarder, in order to ensure that the requested exit speed is reached. In some embodiments retarder controller 142 may determine the amount of pressure to be applied by the retarder against the cut based on the requested exit speed and/or characteristics of the cut (e.g., weight, composition, type of train cars in cut, amount of train cars in cut, etc.), characteristics of the track (e.g., length of track, type of track, etc.), characteristics of the retarder (e.g., size, composition, design, power, brake pad materials, pressure capability, etc.), environmental conditions, etc.

In embodiments, retarder controller 142 may be configured to track and control operations of the retarder as the cut travels the length of the retarder. For example, retarder controller 142 may determine a first amount of pressure to be applied by a retarder against a cut in order to reach a requested exit speed at the exit point of the retarder. In this example, as the cut enters the retarder, retarder controller 142 may cause the retarder to apply the first amount of pressure against the cut. Speed measurements of the cut at a first section of the retarder may be obtained by retarder controller 142. In one example, retarder controller 142 may determine that the speed measurements at the first section indicate that the cut has slowed down an expected amount of speed (e.g., an amount of speed that ensures that the requested exit speed may be reached). In this case, retarder controller 142 may allow operations of the retarder to continue without further intervention at this time. In another example, however, retarder controller 142 may determine that the speed measurements at the first section indicate that the cut has not slowed down the expected amount of speed, and instead has slowed down either less or more than the expected amount. In this case, retarder controller 142 may determine to change the amount of pressure to be applied by the remainder of the retarder sections from the first amount of pressure to a second amount of pressure in order to ensure that the requested exit speed is reached at the exit point of the retarder. For example, if the speed measurements at the first section indicate that the cut has slowed down less than the expected amount of speed, retarder controller 142 may determine to increase the amount of pressure to be applied by the remainder of the retarder sections in order to ensure that the requested exit speed is reached at the exit point of the retarder. On the other hand, if the speed measurements at the first section indicate that the cut has slowed down more than the expected amount of speed, retarder controller 142 may determine to decrease the amount of pressure to be applied by the remainder of the retarder sections in order to ensure that the requested exit speed is reached at the exit point of the retarder. In this manner, the functionality of retarder controller 142 may enable system 100 to compensate for deviations between expected energy removal at different sections of a retarder and the actual energy removal.

Figure 2A:
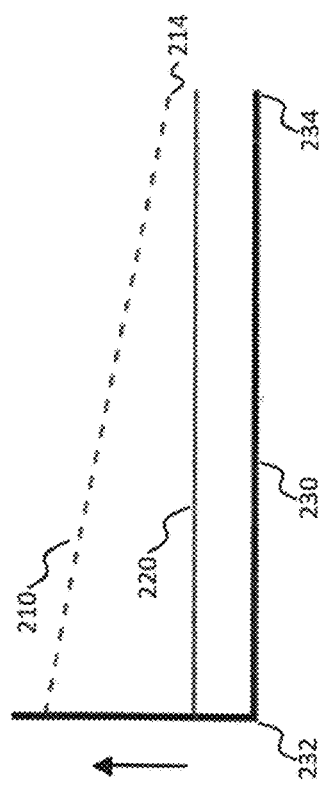
FIGS. 2A-2C illustrate various examples of energy removal based on pressure applied by a retarder.
Figure 2B:
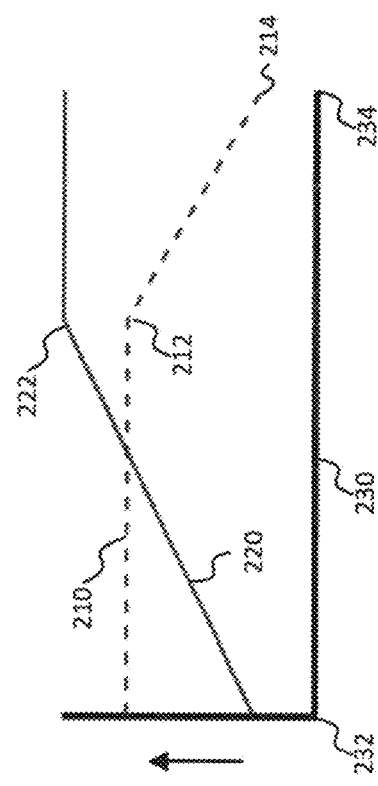
Figure 2C:
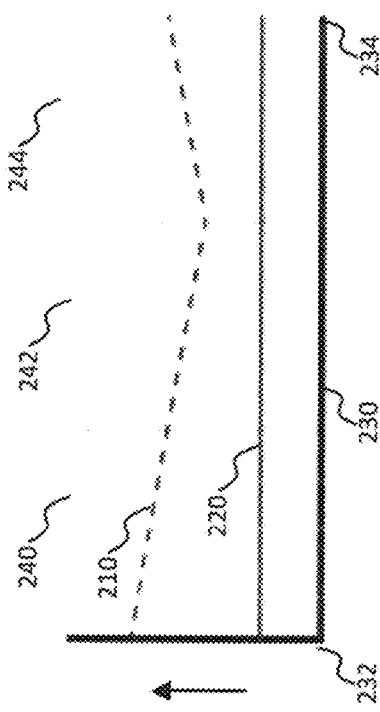

It is important to note that the functionality of retarder controller 142 to compensate for deviations between expected energy removal at different sections of a retarder and the actual energy removal may serve to obscure problems with a retarder. For example, even if a retarder is able to remove the requested energy from a cut (e.g., the exit speed of the cut is the requested speed or within a threshold value of the requested exit speed), this is not an indication of whether the energy removal by the retarder was performed efficiently, or whether the retarder controller had to compensate during energy removal (e.g., by increasing the amount of pressure to be applied by the retarder). FIGS. 2A-2C illustrate various examples of energy removal based on pressure applied by a retarder.

As shown in FIG. 2A, speed curve 210 may represent a curve of the speed of a cut as the cut travels the length 230 of a retarder from entry point 232 to exit point 234. Pressure curve 220 may represent a curve of the pressure applied by the retarder against the cut as the cut travels from entry point 232 to exit point 234 of the retarder. In FIG. 2A, speed curve 210 and pressure curve 220 are mapped against each other such that, at any point along the length 230 of the retarder, the amount of pressure at pressure curve 220 corresponds to the speed at speed curve 210. As shown in the example illustrated in FIG. 2A, for this particular retarder, a cut may enter the retarder at entry point 232. Upon entering the retarder, an initial pressure may be applied by the retarder against the cut, which may cause the speed of the cut to decrease. In embodiments, the initial pressure may be calculated by a retarder controller based on a requested exit speed and the characteristics of the retarder, which may be known to the retarder controller and may include a determination of an amount of energy that a particular amount of pressure applied by the retarder may remove. In this example, the pressure applied by the retarder against the cut may remain constant throughout the length 230 of the retarder as the speed of the cut is reduced until it reaches target exit speed 214 at exit point 234. In this example, the initial pressure applied by the retarder is not changed, as the initially applied pressure causes the cut to slow down sufficiently to ensure that the target exit speed 214 is reached at the exit point 234, and as such, the retarder controller determines to maintain the initially applied speed. This example represents normal operations of a good retarder.

FIG. 2B shows an example of energy removal based on pressure applied by a potentially defective retarder. In this example, a cut may enter the retarder at entry point 232. Upon entering the retarder, an initial pressure may be applied by the retarder against the cut. In embodiments, the initial pressure may be calculated by a retarder controller based on a requested exit speed and the characteristics of the retarder, which may be known to the retarder controller and may include a determination of an amount of energy that a particular amount of pressure applied by the retarder may remove. However, it may be determined that in this example (e.g., by the retarder controller) that the initially applied pressure may not cause the cut to slow down, as expected, sufficiently to ensure that the target exit speed 214 is reached at exit point 234. In response to this determination, the retarder controller may determine to increase the pressure applied by the retarder against the cut in order to remove higher amount of energy in the remainder of the length 230. In this example, the retarder controller may continue to increase the pressure applied by the retarder against the cut until point 222, as the speed of the retarder may still not be sufficiently decreased to reach target exit speed 214 at exit point 234 in the remainder of the length 230. However, the pressure applied by the retarder against the cut starting at point 222 may ensure that enough energy is removed from the cut throughout the remaining length 230 of the retarder to reach target exit speed 214 at exit point 234.

It is noted that, in both examples illustrated in FIGS. 2A and 2B, the target exit speed was reached at exit point 234. However, the energy removal in the example of FIG. 2B was not as efficient as the energy removal of FIG. 2A, as the energy removal in the example of FIG. 2B required increasing the applied pressure of the retarder as the initially calculated pressure was not sufficient to ensure the exit speed was reached. The reason for the inefficient energy removal in the example of FIG. 2B may be that one or more sections of the retarder may be defective or are becoming defective. As mentioned above, wear and tear of the retarders may cause one or more sections to degrade and may not be able to remove as much energy as before.

For example, as illustrated in FIG. 2C, a retarder spanning a length 230 from entry point 232 to exit point 23 may include three sections, namely first section 240, second section 242, and third section 244. In this example, the pressure curve 230 of the retarder may show that a constant pressure was applied by the retarder against a cut passing through the retarder throughout the length of the retarder. The speed curve 210 may show that the constant pressure applied by the retarder against the cut may cause the cut to slow down by a first amount throughout first section 240. Similarly, the constant pressure applied by the retarder against the cut may cause the cut to slow down by a second amount throughout second section 242. However, throughout third section 244, the constant pressure applied by the retarder against the cut may cause the cut may not cause the cut to slow down, but instead the cut may speed up and gain speed. This may indicate that there may be an issue with the third section of the retarder. During operations, the retarder controller may compensate for the problems with the third section by increasing the pressure applied by the retarder against the cut while the cut passes the third section. However, the compensation operations by the retarder controller may mask the problem with the retarder as an operator may not perceive that there is a problem with the retarder since the requested exit speed may still be reached (thanks to the compensation by the retarder controller).

With reference back to FIG. 1, in embodiments, each of retarders 140 may be laid out at different points along the tracks of a classification yard. In some embodiments, each of the marshalling tracks of the classification yard may include one or more retarders of retarders 140. In some embodiments, a main master retarder may be positioned along the main marshalling track (e.g., along the release section) of the hump track. In some embodiments, each segment of a route along the marshalling tracks of the classification yard may be configured with at least one retarder. In some embodiments, each segment of a route along the marshalling tracks of the classification yard may be configured with a master retarder and one or more slave retarders. In these embodiments, the retarders along a segment of a route may cooperatively operate to remove energy from a cut traveling through the segment.

In embodiments, measuring the speed of a cut (e.g., measuring the speed of a cut at the entry point of a retarder, at various points along the length of the retarder, and/or at the exit point of the retarder) may be performed using detectors. In embodiments, a detector may be configured to detect a speed of a cut at a particular point. In embodiments, detectors may be laid out at different points along the tracks of the classification yard. In this manner, detectors may be configured to detect the speed of a cut at various points along the route of the cut through the marshalling tracks of the classification yard. For example, one or more detectors of detectors 144 may be positioned at points along the tracks of the classification yard 140 in a layout configured to enable the one or more detectors to measure the speed of a cut traveling through a retarder (e.g., one or more retarders of retarders 140). In this manner, the detectors may be configured to measure an entry speed and/or an exit speed of a cut through a retarder, in which the entry speed may indicate the speed at which the cut entered the retarder and the exit speed may indicate the speed at which the cut exited the retarder, as well as the speed of the cut at various points (e.g., at various sections) along the length of the retarder.

In another example, one or more detectors of detectors 144 may be positioned at points along the tracks of classification yard 140 in a layout configured to enable the one or more detectors to measure the speed of a cut traveling through a segment of a route along which the cut may be traveling through the marshalling tracks of classification yard 140 to reach a destination train. For example, the one or more detectors may be configured to measure an entry speed and/or an exit speed of the cut through one or more segments, in which the entry speed may indicate the speed at which the cut entered the segment and the exit speed may indicate the speed at which the cut exited the segment.

In yet another example, detectors 144 may be configured to measure a speed at which a cut may be traveling while passing through one or more switches (e.g., one or more switches from switches 142). For example, as a cut passes through a switch, one or more detectors of detectors 144 may be configured to measure the speed of the cut as it passes through the switch.

In some embodiments, the detectors may detect a speed of a cut by detecting a cut at multiple detectors and measuring the time between the detections. For example, a cut may pass a first detector at a first time. The first detector may detect the cut (e.g., a wheel of the cut) at the first time. A first detection of the cut may be generated with a timestamp equal to the first time. The cut may continue travelling and may pass a second detector at a second time. The second detector may detect the cut (e.g., a wheel of the cut) at the second time. A second detection of the cut may be generated with a timestamp equal to the second time. In embodiments, the speed of the cut may be calculated by comparing the first and the second time, and determining a speed based on the distance between the first and the second detectors, which may be a known characteristic of the first and second detectors. For example, the distance between the first and second detector traveled by the cut over the difference between the first and second detection times may provide the speed of the cut between the first and second detectors.

In some embodiments, the detectors may detect a speed of a cut by detecting multiple wheels of the cut, measuring the time between the detections, and calculating a speed based, at least in part, on the distance between the multiple wheels. For example, a cut may travel through a detector. The detector may detect a first wheel of the cut at a first time. A first detection of a first wheel of the cut may be generated with a timestamp equal to the first time. The detector may detect a second wheel of the cut at a second time. A second detection of the second wheel of the cut may be generated with a timestamp equal to the second time. In embodiments, the speed of the cut may be calculated by comparing the first and the second time, and determining a speed based on the distance between the first and the second wheel, which may be a known characteristic of the cut. For example, the distance between the first and second wheel traveled by cut over the difference between the first and second detection times may provide the speed of the cut over the detector.

Data collector 150 may be configured to capture and store (e.g., in a database, such as database 124) car event data related to car events associated with retarders 140. In embodiments, during operations, predictions of the speed and/or arrival times of a cut at a device (e.g., a retarder) may be made during classification operations of a classification yards. For example, a production prediction manager may generate production predictions (e.g., using control parameters including tuning coefficients, characteristics of the cut, characteristics of the track or device, etc.) of a speed and/or arrival times of a cut at a particular device. In embodiments, the production predictions may include production predictions for a plurality of cuts scheduled to be classified through the classification yard and for many devices (e.g., switches, detectors) and/or segments of the classification yard. With respect to retarders, a production prediction manager may generate production predictions of a speed and/or arrival times of a cut at a retarder, such as speed and/or arrival time of the cut at the entry point of the retarder, speed and/or arrival time of the cut at the exit point of the retarder, amount of energy to be removed by the retarder, etc. Operations and techniques of a system for generating production predictions is described in related U.S. Patent Application Docket No. [BNSF-00163], the entire contents of which are herein incorporated by reference for all purposes.

In embodiments, a target exit speed of a cut passing through a retarder may be determined based on a production prediction associated with the cut passing the retarder. For example, the production prediction may specify the expected entry speed and the expected exit speed of the cut passing the retarder, and a target exit speed for the cut passing through the retarder may be determined. In these embodiments, a request of an exit speed for the cut may be sent to the retarder (e.g., to the retarder controller). Based on the requested exit speed, the retarder controller may perform control operations to ensure that the cut reaches the requested exit speed at the exit point of the retarder.

In embodiments, as the cut associated with the production prediction, and for which an exit speed has been requested from the retarder, travels along the classification route, the cut may arrive at the retarder during operations. The cut may enter the retarder at the entry point at an entry speed, may pass through the sections of the retarder, each at a certain speed, and may exit the retarder at the exit point at an exit speed. These speed data, which may represent real-world measurements of the actual speed of the cut through the retarder, may be captured by data collector 150 and included into a car event associated with the retarder. In this manner, a car event associated with the retarder may represent a cut passing through the retarder. In embodiments, a car event associated with a retarder may also include the requested exit speed for the cut from the retarder. In some embodiments, the car event may also include an amount of pressure applied by the retarder against the wheels of the cut to remove an amount of energy necessary to reach the requested exit speed, a distribution of the amount of pressure applied by the retarder at each section of the retarder and/or the length that the pressure was applied by the retarder at each section, a speed of the cut at each of the sections of the retarder, an identification of the cut associated with the car event, an identification of the retarder for which the car event was generated, and/or other conditions associated with the car event (e.g., weather, type of train cars in the cut, type of bearings of the cut, identification of the cut, etc.)

In embodiments, a car event may also include the production prediction associated with the car event. For example, for a car event, the production prediction may predict the expected entry speed and the expected exit speed of the cut passing through the retarder, as well as the expected energy removal by the retarder from the cut.

In embodiments, data collector 150 may store the car events associated with each of retarders 140 into a database (e.g., database 124) for subsequent analysis.

User terminal 130 may include a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. In embodiments, user terminal 130 may provide a user interface that may be configured to provide an interface (e.g., a graphical user interface (GUI)) structured to facilitate an operator interacting with system 100, e.g., via network 145, to execute and leverage the features provided by server 110. In embodiments, the operator may be enabled, e.g., through the functionality of user terminal 130, to provide configuration parameters that may be used by system 100 to provide functionality for determining status of retarders, as well as to interact with results (e.g., selection, confirmation, verification of results, etc.). In embodiments, user terminal 130 may be configured to communicate with other components of system 100. In embodiments, the functionality of user terminal 130 may include presenting results of retarder status determination operations to an operator. In embodiments, the results of retarder status determination operations may be presented to an operator via the GIU of user terminal 130.

In embodiments, server 110, classification yard 140 (and its various components), and user terminal 130 may be communicatively coupled via network 145. Network 145 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc.

Server 110 may be configured to facilitate operations for determining a status of retarder devices in a classification yard in accordance with embodiments of the present disclosure. In embodiments, functionality of server 110 to facilitate determination of a status of retarder devices in a classification yard may be provided by the cooperative operation of the various components of server 110, as will be described in more detail below.

Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of server 110 as single and separate blocks, each of the various components of server 110 may be a single component (e.g., a single application, server module, etc.), may be functional components of a same component, or the functionality may be distributed over multiple devices/components. In such embodiments, the functionality of each respective component may be aggregated from the functionality of multiple modules residing in a single, or in multiple devices. In addition, particular functionality described for a particular component of server 110 may actually be part of a different component of server 110, and as such, the description of the particular functionality described for the particular component of server 110 is for illustrative purposes and not limiting in any way.

As shown in FIG. 1, server 110 includes processor 111, memory 112, database 124, data compiler 121, thresholding analysis manager 122, and results manager 123. Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some embodiments, implementations of processor 111 may comprise code segments (e.g., software, firmware, and/or hardware logic) executable in hardware, such as a processor, to perform the tasks and functions described herein. In yet other embodiments, processor 111 may be implemented as a combination of hardware and software. Processor 111 may be communicatively coupled to memory 112.

Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Memory 112 may also be configured to facilitate storage operations. For example, memory 112 may comprise database 124 for storing various information related to operations of system 100. For example, database 124 may store analysis models, threshold data, configuration information, etc., to be used for configuring system 100, etc. In embodiments, database 124 may store characteristics of various and different train cars, such as rolling resistance characteristics, weights, aerodynamic characteristics (e.g., drag coefficient, coupler overhang status, articulation status of the etc. In embodiments, database 124 may store car event data related to speed, energy, and/or arrival times measurements of various cuts at various points (e.g., devices and/or segments) of the classification yard.

Database 124 is illustrated as integrated into memory 112, but in some embodiments, database 124 may be provided as a separate storage module or may be provided as a cloud-based storage module. Additionally, or alternatively, database 124 may be a single database, or may be a distributed database implemented over a plurality of database modules.

Data compiler 121 may be configured to retrieve data related to car events associated with retarders, and to filter the data according to various configuration parameters for subsequent thresholding analysis (e.g., by threshold analysis manager 122). In some embodiments, data compiler 121 may include functionality to format and/or present car event data to an operator.

In embodiments, data compiler 121 may provide a robust mechanism for configuring, controlling, and executing data retrieval and compilation functionality in order to obtain a most appropriate set of car events and leverage the car event data to determine a status of a retarder or retarders. For example, in embodiments, data compiler 121 may be configured to retrieve and compile the car event data by configuring and scheduling one or more analysis jobs that include configuration associated with the analysis job itself as well as the car event data against which thresholding analysis is to be performed.

In embodiments, configuring an analysis job may include specifying values for various parameters defining characteristics of the job as well as characteristics of the car events to be included in the thresholding analysis. In a sense, the configuration of an analysis job may serve to filter car events in the database so that data compiler 121 may compile those car events that meet the configuration (e.g., pass the filters). The resulting set of car events may be used in the thresholding analysis (e.g., performed by thresholding analysis manager 122) to determine a status of one or more retarders. For example, in embodiments, the various parameters defining characteristics of the job may include parameters for specifying attributes of the job, such as a schedule name, a starting time of the job, a minimum time period that the job should run, how often the job is to be scheduled (e.g., daily, weekly, monthly, etc.), how often the job is to recur (e.g., re-perform analysis of particular car events), etc. In embodiments, the various parameters defining characteristics of the car events to be included in the analysis may include parameters for specifying a retarder which car events are to be compiled (e.g., an identification of the retarder), a minimum car event count (e.g., a minimum number of retarder car events, etc.), a type of precipitation associated with the car events, such as the precipitation status when the car event was recorded (e.g., dry, wet, rain, snow, rust, all, etc.), a maximum temperature at the time of the car event, a minimum temperature at the time of the car event, an indication of a time period that each task performing the analysis job may be available after completion, etc.

In some embodiments, data compiler 121 may be configured to provide a user interface (UI) via which an operator may specify values for the various configuration parameters of an analysis job. For example, data compiler 121 may present the UI (e.g., via user terminal 130) to the operator and may include various fields via which the operator may specify values for respective configuration parameters. In some embodiments, the values for the various configuration parameters of an analysis job may be automatically selected by data compiler 121, such as by retrieving values stored in database 124, which may be previously specified by an operator or may be default values.

In embodiments, scheduling an analysis job may include defining a period over which the analysis job may be executed, as well as the recursive configuration of the analysis job. In embodiments, an analysis job may be scheduled, which may make the analysis job available to be executed. The execution of the analysis job may be performed using tasks, in which case the job may be executed against a set of car events currently available via a task execution. In this manner, a task for an analysis job may execute the analysis job based on the analysis job configuration on car event data current available. In some embodiments, a second task may be started for the same analysis job, in which case the second task may execute the analysis job (e.g., in accordance with the analysis job configuration) against a set of car events as available with respect to the second task. In this manner, as car event data in the database changes (e.g., more data is collected), a task may permit the analysis job to be executed for the data as it changes. For example, an analysis job may be scheduled to be run weekly, in which case, every week, data compiler 121 may compile car events (e.g., from database 124) that meet the analysis job configuration into a task which is executed to perform the determination of the status of one or more retarders in the classification yard. This functionality may allow data retriever and compiler 121 to ensure that the analysis job for retarder status determination may be performed recursively, and in this manner the results of a first iteration of the analysis job may be leveraged in a subsequent execution (e.g., via a second task). In addition, the use of tasks may also enable the analysis to be performed over different sets of car event data, which may facilitate a diverse thresholding analysis of the data.

In embodiments, the functionality of data compiler 121 to enable the configuration of analysis jobs may provide a mechanism to configure different analysis jobs with different sets of configuration parameter values, which may combine for a full deployment of configurations that may cover a large set of situations, conditions, and/or configurations. In some embodiments, data compiler 121 may include functionality to combine jobs, such as by defining a field for specifying that an analysis job is combinable. In embodiments, combining analysis jobs may include combining the results (e.g., retarder status determination results) of the analysis jobs, such as for presentation to an operator for verification, confirmation, and/or corrective actions to address retarder status results.

In embodiments, analysis jobs may include configuration that may enable car event data to be classified based on various factors. For example, a particular car event may be classified into a particular classification (e.g., a particular data bucket) based on environmental conditions (e.g., weather, etc.), train car type, bearing type of the train car, etc. In embodiments, the various classifications, or buckets, may include a cold bucket (e.g., that may be used to classify car events that occur during cold weather), a warm bucket (e.g., that may be used to classify car events that occur during warm weather), a hot bucket (e.g., that may be used to classify car events that occur during hot weather), a wet bucket (e.g., that may be used to classify car events that occur during wet weather), a snow bucket (e.g., that may be used to classify car events that occur during snowy weather), a rain bucket (e.g., that may be used to classify car events that occur during rainy weather), a dry bucket (e.g., that may be used to classify car events that occur during dry weather), a resilience type bucket (e.g., that may be used to classify car events based on whether the cut includes train cars with a resilience type bearing), etc. It will be appreciated that the description of the above data buckets that may be used to classify car events are provided for illustrative purposes and not by way of limitation. As such, additional and/or different data buckets may be used to classify car events.

In embodiments, an analysis job may be configured as corresponding to a particular data bucket (e.g., an analysis job may be configured to be used for determining status of retarders using car event data associated with a data bucket). In these embodiments, the results of the analysis jobs may be specifically tailored to the conditions associated with the particular data bucket with which the analysis job is configured. In this manner, this functionality to configure a job with a data bucket may enable system 100 to perform operations for determining a status of retarders in a classification yard in which the status determination is tailored for particular conditions (e.g., environmental conditions, train car type, bearing type of the train car, etc.). In embodiments, this functionality may allow system 100 to ensure that device status determinations are made based on prevailing conditions. For example, in some cases, some retarders may be known to operate inefficiently in cold weather, as compared with the efficiency of the retarders in warm weather. In this case, by tailoring the thresholding analysis to a particular prevailing condition, the results may take into account the currently prevailing conditions, which may prevent misidentification of retarder status (e.g., a good retarder may be labeled as bad during cold weather if the thresholding analysis does not take into account the cold weather conditions).

In embodiments, the configuration of the analysis job may specify the data bucket applicable to the analysis job. For example, an analysis job may be configured as applicable to the cold bucket. In this example, data compiler 121 may operate to compile a set of car events for thresholding analysis that includes car events that occur during cold weather. In this manner, the results of the thresholding analysis using the results of this analysis job may be specifically tailored to cold weather conditions. In another example, an analysis job may be configured as applicable to the dry bucket. In this example, data compiler 121 may operate to compile a set of car events for thresholding analysis that includes car events that occur during dry weather, such as car events occurring while no rain or snow was present. In this manner, the results of the thresholding analysis using the results of this analysis job may be specifically tailored to dry weather conditions. In yet another example, an analysis job may be configured as applicable to the dry and cold bucket. In this example, data compiler 121 may operate to compile a set of car events for thresholding analysis that includes car events that occur during dry and cold weather, such as car events occurring during cold weather while no rain or snow was present. In this manner, the results of the thresholding analysis using the results of this analysis job may be specifically tailored to dry and cold weather conditions. In still another example, an analysis job may be configured as applicable to a "resilience bearing true" bucket. In this example, data compiler 121 may operate to compile a set of car events for thresholding analysis that includes car events in which each cut generating each of the car events including one or more train cars having resilient bearing. In this manner, the results of the thresholding analysis using the results of this analysis job may be specifically tailored to reliance bearing conditions.

In some embodiments, current or recent car event data may include car event data associated with a particular data bucket representing currently prevailing conditions. For example, currently prevailing conditions may include cold weather (e.g., currently may be winter in the location of classification yard 140). In this case, the current and/or recent car event data in the database may include mostly, if not exclusively, cold weather car events (e.g., car events belonging to the cold data bucket) due to the currently prevailing weather conditions. In embodiments, analysis jobs that may executed to be used for thresholding analysis may include these mostly, if not exclusively, cold weather car events, which may result in retarder status determination results (e.g., based on thresholding analysis) that may be biased and/or tailored to the prevailing weather conditions (e.g., cold weather conditions in this example).

Following the example above, if and when the weather changes to warmer conditions, a next car event (or a series of next car events) may be warm car events. In this case, it may be desirable to ensure that the thresholding analysis for determining a status of retarders may be tailored to the new warmer prevailing condition. However, as most of the previous car events may include cold weather car events, due the previously prevailing cold weather conditions, tuning the thresholding analysis for determining a status of retarders to the current warm weather conditions may be challenging, as the current data is biased to cold weather (e.g., previously prevailing condition). To address this, data compiler 121 may provide functionality to specify alternate data buckets into which car events may be classified. In embodiments, an analysis job may be configured with parameters that may specify a main data bucket and one or more alternate data buckets. In these embodiments, the analysis job may be executed against a set of car events that includes car events associated with the main data bucket. However, if no car events associated with the main data bucket exist in the database, or if less than a threshold number of car events associated with the main data bucket exist in the database, data retriever and compiler 121 may operate to include car events associated with the one or more alternate data buckets. For example, configuration of an analysis job may specify a warm bucket, with a cold bucket as alternative. However, the weather conditions recently change from cold to warm. As a result, there may be no or limited warm weather car events. In this case, the warm bucket analysis job still may be executed, but against a set of car events that may include cold weather car events. The results of the analysis job may be used to automatically tune the thresholding analysis for determining a status of retarders. This functionality to specify alternative data buckets for an analysis job may enable system 100 to provide a mechanism to leverage the benefits of the thresholding analysis for determining a status of retarders functionality of embodiments, even when the car event data may not be perfectly fit to the current prevailing conditions.

In embodiments, data compiler 121 may be configured to provide the compiled set of car events for a particular analysis job to thresholding analysis manager 122. In embodiments, each car event may be associated with a retarder, and may represent an event in which a cut passes through a retarder, and may include information related to the speed, energy, and/or arrival time of the cut at the entry point of the retarder, at the exit point of the retarder, and throughout the length of the retarder (e.g., through the various sections of the retarder).

In embodiments, a flag may be provided in configuration for a retarder that may be used to specify the status of the retarder. For example, the flag may be used to indicate a "good retarder" status indicating that the status of the retarder is good, which may indicate that the retarder is able to slow down a cut to a requested exit speed, a "bad retarder" status indicating that the status of the retarder is bad, which may indicate that the retarder is not able to slow down a cut to a requested exit speed, and/or a "section warning" status indicating that the status of the retarder is not bad or good, which may indicate that although the retarder is able to slow down a cut to a requested exit speed, the energy removal is not as expected or is not efficient, as there may be a defective section within the retarder.

In embodiments, data compiler 121 may be configured to filter car events to be compiled based on the status flag of a retarder. For example, data compiler 121 may determine whether the status flag of a retarder has been reset from a "bad retarder" or "section warning" status to a "good retarder" status. In response to a determination that the status flag of a retarder has been reset from a "bad retarder" or "section warning" status to a "good retarder" status, data compiler 121 may filter out any car events that occurred (e.g., with a timestamp) before the status flag of the retarder was reset from the compiled set of car events to be provided to thresholding analysis manager 122. In this manner, the compiled set of car events to be provided to thresholding analysis manager 122 may include car events for retarders occurring from the time the status flag of the retarder was reset to a current time. This functionality may allow system 100 to ensure that the thresholding analysis is iterative with respect to corrective actions. For example, system 100 may cause a corrective action to be applied to a retarder determined to have a "bad retarder" or "section warning." After the corrective action, however, further thresholding analysis may be performed against the retarder. In the case where the further thresholding analysis is performed on car events including the previous car events, the analysis may be biased toward a bad status finding. By resetting the set of car events that are considered in the determination of the status of a retarder to include only car events after corrective action was taken on the retarder, status results may be more reliable. In addition, resetting the set of car events that are considered in the determination of the status of a retarder to include only car events after corrective action was taken on the retarder may allow system 100 to determine whether a finding of a bad status retarder may be actually caused by the prediction scheme (e.g., the prediction as to the requested exit speeds), rather than an actual bad status of the retarder. In this case, if a retarder is found to have a bad status numerous times after corrective action, system 100 may make a determination that the problem may be not that the retarder is bad, but that the prediction scheme may be out of tune and not as accurate as should be.

In embodiments, data compiler 121 may be configured to calculate, based on the compiled set of car events, an exit speed difference for each car event in the compiled set of car events. In embodiments, data compiler 121 may calculate, for each car event in the compile set of car events, an exit speed difference by calculating a difference between requested exit speeds and actual exit speeds. For example, for a car event associated with a retarder, data compiler 121 may subtract the requested exit speed indicated in the car event from the actual exit speed measured at the exit point of the retarder in real-world measurements. The result of the subtraction is the exit speed difference associated with the car event. Data compiler 121 may perform the same calculations for each car event in the compiled set of car events to obtain an exit speed difference for each car event in the compiled set of car events. The result may be a set of exit speed differences associated with the set of compiled set of car events, where each exit speed difference in the set of exit speed differences represents a difference between a requested exit speed and an actual exit speed at a retarder. In embodiments, a negative exit speed difference may indicate that the actual speed is lower than the requested exit speed, and a positive exit speed difference may indicate that the actual speed is greater than the requested exit speed. In embodiments, the set of exit speed differences may be stored in database 124 and/or may be provided to thresholding analysis manager 122.

In embodiments, data compiler 121 may be configured to generate a visual representation of the set of exit speed differences, and to present the generated visual representation to an operator. For example, in some embodiments, data compiler 121 may generate a box-and-whisker graph from the set of exit speed differences against the deviation represented by an exit speed difference from zero. In this case, a non-zero value for an exit speed difference may represent a deviation from zero, with zero indicating that there is no exit speed difference (e.g., the actual exit speed and the requested exit speed in the car event are the same). In this example, a large deviation from zero may represent a car event in which the retarder was not very accurate (e.g., the energy removal of the retarder was far off from the requested energy removal). On the other hand, a small deviation from zero, or a zero deviation, may represent a car event in which the retarder was very accurate (e.g., the energy removal of the retarder was very close or equal to the requested energy removal).

Figure 3A:
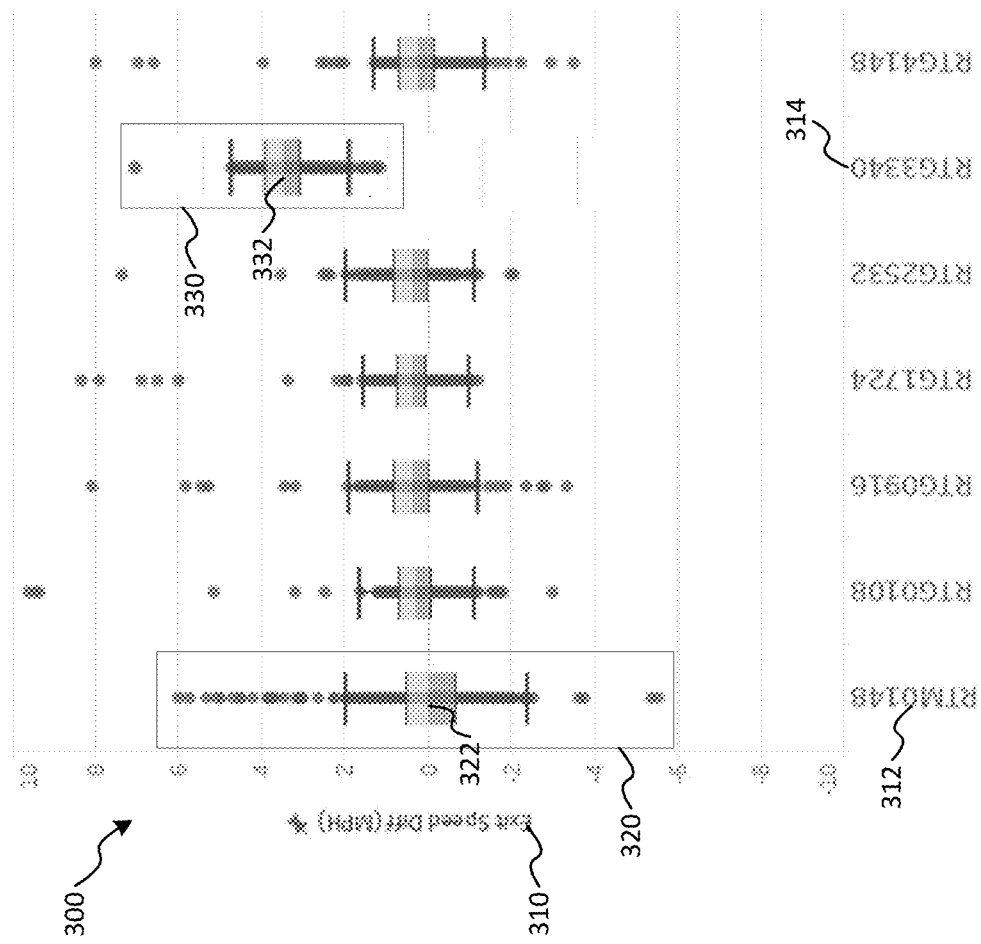
FIG. 3A shows an example of a box-and-whisker chart generated for a set of exit speed differences in accordance with embodiments of the present disclosure.

In embodiments, the box-and-whisker graph may then be presented to the operator using a UI (e.g., via user terminal device 130). FIG. 3A shows an example of a box-and-whisker chart 300 generated for a set of exit speed differences in accordance with embodiments of the present disclosure.

As seen in FIG. 3A, data compiler 121 may generate a box-and-whisker entry for each retarder represented in the compiled set of car events. In this manner, data compiler 121 may aggregate the exit speed differences in box-and-whisker chart 300 by retarders. For example, box-and-whisker entry 320 may correspond to retarder 312, while box-and-whisker entry 330 may correspond to retarder 314. In box-and-whisker 300, a density of each group of data points may be represented with lines, while higher density groups of data points may be represented marked with boxes within those lines. In this example, each exit speed difference (e.g., each exit speed difference calculated for each car event) is entered as a point in the appropriate box-and-whisker entry for the corresponding retarder. For example, all exit speed differences calculated for all events associated with retarder 312 may be entered as points in box-and-whisker entry 320. In this example, the exit speed difference may range from approximately 6 MPH exit speed differences to approximately-6 MPH exit speed differences. In this same example, all exit speed differences calculated for all events associated with retarder 314 may be entered as points in box-and-whisker entry 330, and may range from approximately 7 MPH exit speed differences to approximately .5 MPH exit speed differences. In this example, the spread of the exit speed differences for retarder 314 (e.g., approximately 6.5 MPH spread) seems to be tighter than the spread of the exit speed differences for retarder 312 (e.g., approximately 12 MPH spread).

In embodiments, each box-and-whisker entry of box-and-whisker chart 300 may include an indication of the median value of the spread of each box-and-whisker entry. For example, for retarder 312, the median value 322 of box-and-whisker entry 320 is approximately zero, which may indicate that many of the cuts passing through retarder 312 exited retarded 312 with an exit speed close to the requested exit speed. In this same example, for retarder 314, the median value 332 of box-and-whisker entry 330 is approximately 3.5 MPH, which may indicate that many of the cuts passing through retarder 314 exited retarded 312 with an exit speed far off to the requested exit speed.

In some embodiments, an operator presented with box-and-whisker chart 300 may gain insight into the operational performance of the retarders represented in box-and-whisker chart 300, and may even make maintenance decisions to ensure that corrective action is taken on retarders that may not be operating efficiently.

With reference back to FIG. 1, in embodiments, data compiler 121 may be configured to calculate, based on the compiled set of car events, a change in speed per utilization percentage (−ΔE/% U) metric for each car event in the compiled set of car events. In embodiments, the −ΔE/% U metric for a car event may indicate the amount of utilization (e.g., % U) of a retarder (e.g., as a percentage during the car event) that was used in order to obtain a particular change in speed (e.g., ΔE) for a cut. In embodiments, the −ΔE/% U metric may be obtained for a car event for each section of the retarder associated with the car event. For example, a −ΔE/% U metric may be obtained for a first section of a retarder associated with a car event, where the −ΔE/% U metric for the first section of the retarder may indicate the change in energy across the first section per percentage point of position of the retarder (e.g., the change in utilization of the retarder within the first section). In embodiments, data compiler 121 may calculate, for each car event in the compiled set of car events, a −ΔE/% U metric for each section of each retarder based on real-world measurements. For example, for a car event, data compiler 121 may calculate a −ΔE/% U metric for each section of the retarder associated with the car event based on the real-world measurements associated with the car event. Data compiler 121 may perform the same calculations for each car event in the compiled set of car events to obtain a −ΔE/% U metric for each section of each retarder associated with each car event in the compiled set of car events. The result may be a set of −ΔE/% U metrics associated with the set of compiled set of car events, where each −ΔE/% U metric in the set of −ΔE/% U metrics represents a −ΔE/% U metric for a retarder section. In embodiments, a larger −ΔE/% U metric may indicate that a section of a retarder is performing better than a section associated with a smaller −ΔE/% U metric. In embodiments, the set of −ΔE/% U metrics may be stored in database 124 and/or may be provided to thresholding analysis manager 122.

In embodiments, data compiler 121 may be configured to generate a visual representation of the set of −ΔE/% U metrics, and to present the generated visual representation to an operator. For example, in some embodiments, data compiler 121 may generate a box-and-whisker graph from the set of −ΔE/% U metrics. In this case, a small −ΔE/% U metric may indicate that the utilization of a section within a retarder did not yield an expected energy change in the cut. This may be an indication that the section of the retarder may not be removing energy efficiently, perhaps due to corrective action needed. On the other hand, a large −ΔE/% U metric may indicate that the utilization of a section within a retarder yielded an expected energy change in the cut, which may be an indication that the section of the retarder may be operating efficiently.

Figure 3B:
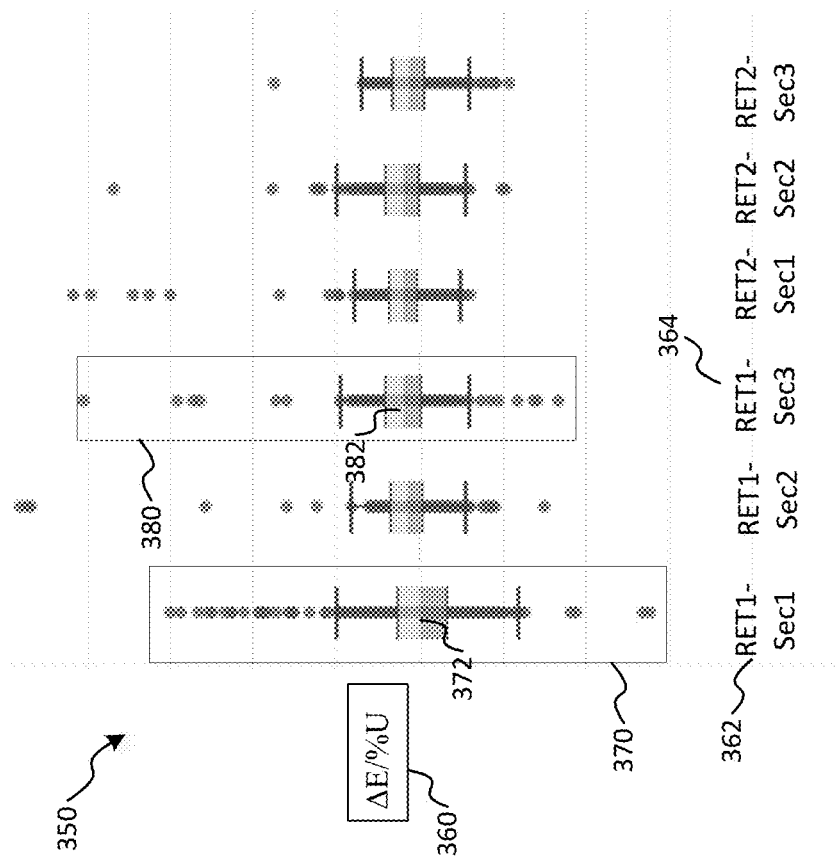
FIG. 3B shows an example of a box-and-whisker chart generated for a set of utilization per energy change metrics in accordance with embodiments of the present disclosure.

In embodiments, the box-and-whisker graph may then be presented to the operator using a UI (e.g., via user terminal device 130). FIG. 3B shows an example of a box-and-whisker chart 350 generated for a set of −ΔE/% U metrics in accordance with embodiments of the present disclosure.

As seen in FIG. 3B, data compiler 121 may generate a box-and-whisker entry for each retarder represented in the compiled set of car events. In particular, data compiler 121 may generate a box-and-whisker entry for each section of each retarder represented in the compiled set of car events. In this manner, data compiler 121 may aggregate the −ΔE/% U metrics for all the sections of each retarder in box-and-whisker chart 350 by retarder section. For example, box-and-whisker entry 370 may correspond to section 362, which may represent the first section of a first retarder, while box-and-whisker entry 380 may correspond to section 364, which may represent the third section of the first retarder. In box-and-whisker 350, a density of each group of data points may be represented with lines, while higher density groups of data points may be represented marked with boxes within those lines. In this example, each −ΔE/% U metric (e.g., each −ΔE/% U metric calculated for each section of each retarder associated with each car event) is entered as a point in the appropriate box-and-whisker entry for the corresponding retarder section. For example, all −ΔE/% U metrics calculated for all car events associated with retarder section 372 may be entered as points in box-and-whisker entry 370. In this same example, all −ΔE/% U metrics calculated for all car events associated with retarder section 364 may be entered as points in box-and-whisker entry 330.

In embodiments, each box-and-whisker entry of box-and-whisker chart 300 may include an indication of the median value of the spread of each box-and-whisker entry. For example, for retarder section 362, a median value 372 may be represented in the box-and-whisker entry 370. In this same example, for retarder section 364, a median value 382 may be represented in the box-and-whisker entry 380.

In some embodiments, an operator presented with box-and-whisker chart 300 may gain insight into the operational performance of retarder sections represented in box-and-whisker chart 300, and may even make maintenance decisions to ensure that corrective action is taken on retarders that may not be operating efficiently.

With reference back to FIG. 1, thresholding analysis manager 122 may be configured to apply thresholding analysis to the compiled set of car event data to determine a status of each retarder represented in the compiled set of car event data. In particular, thresholding analysis manager 122 may perform thresholding analysis using the set of exit speed differences and/or the set of −ΔE/% U metrics generated by data compiler 121, as described above. In embodiments, the thresholding analysis applied by manager 122 may include application of one or more rules to the data in set of exit speed differences and/or the set of −ΔE/% U metrics and to determine the status of the retarder indicated by the result of the application of the one or more rules.

In embodiments, a first set of rules that may be applied in the thresholding analysis may include speed differential rules that may be applied to exit speed differences associated with a retarder. The speed differential rules may be applied to the set of exit speed differences generated by data compiler 121 and may be configured to determine the status of a retarder based on the rule application.

In embodiments, a first speed differential rule may include a rule that determines that the status of a retarder is good when no more than a threshold percentage of actual speed data points associated with the retarder are outside of a plus or minus speed from a requested speed. Put another way, the first speed differential rule determines that the status of a retarder is good when no more than a threshold percentage of exit speed differences are outside the range defined between [+speed threshold and −speed threshold]. In embodiments, thresholding analysis manager 122 may apply this first speed differential rule against the set of exit speed differences to determine, for each retarder, the percentage of exit speed differences associated with each retarder that are outside the range defined between [+speed threshold and −speed threshold]. Thresholding analysis manager 122 may then compare the percentage of exit speed differences associated with each retarder that are outside the range defined between [+speed threshold and −speed threshold] with the threshold percentage. If, for a particular retarder, the percentage of exit speed differences associated with each retarder that are outside the range defined between [+speed threshold and −speed threshold] is less than the threshold percentage, thresholding analysis manager 122 may determine that the particular retarder has passed the first speed differential rule. On the other hand, if, for the particular retarder, the percentage of exit speed differences associated with each retarder that are outside the range defined between [+speed threshold and −speed threshold] is not less than the threshold percentage, thresholding analysis manager 122 may determine that the particular retarder has failed the first speed differential rule.

For example, a threshold percentage of 75% and a plus or minus speed threshold of 1 MPH may be specified for the first speed differential rule. In this example, thresholding analysis manager 122 may determine, based on the set of exit speed differences, for a first retarder, the percentage of exit speed differences associated with the first retarder that are greater than plus or minus 1 MPH. Thresholding analysis manager 122 may then compare the percentage of exit speed differences associated with the first retarder that are greater than plus or minus 1 MPH with the threshold percentage of 75%. In this example, if the percentage of exit speed differences associated with the first retarder that are greater than plus or minus 1 MPH is less than 75%, thresholding analysis manager 122 may determine that the first retarder passed the first speed differential rule. However, if the percentage of exit speed differences associated with the first retarder that are greater than plus or minus 1 MPH is not less than 75%, thresholding analysis manager 122 may determine that the first retarder failed the first speed differential rule. Thresholding analysis manager 122 may continue applying the first speed differential rule to all retarders represented in the set of exit speed differences to determine the status of each retarder represented in the set of exit speed differences.

In embodiments, thresholding analysis manager 122 may apply the first speed differential rule to a retarder with a parameter that ensures that the result of the application will be a percentage ratio between the percentage of exit speed differences associated with the retarder that are outside the range defined between [+speed threshold and −speed threshold] and the parameter, such that the retarder may be considered as a bad retarder by thresholding analysis manager 122 when the percentage ratio is at least 100%. In these embodiments, the parameter may include a value by which the percentage of exit speed differences associated with the retarder that are outside the range defined between [+speed threshold and −speed threshold] is divided. For example, thresholding analysis manager 122 may calculate the percentage of exit speed differences associated with the retarder that are outside the range defined between [+speed threshold and −speed threshold] and may then divide the percentage by the parameter. The result may be a value configured to be 1 (or 100%) when the percentage of exit speed differences associated with the retarder that are outside the range defined between [+speed threshold and −speed threshold] is above the threshold percentage. In embodiments, a retarder may be determined to not fail the first differential rule, but the percentage ratio may be close to 100%, in which case, even though the retarder may not be flagged as a bad retarder, the retarder may be flagged as needing attention (e.g., using a "section warning" indication or a "warning" indication), as it may be close to becoming a bad retarder. In this manner, thresholding analysis manager 122 may be configured to determine "how close" a retarder may be to failing. In some embodiments a percentage ratio threshold may be used to determine to flag a retarder as needing attention (e.g., a warning) even though the retarder may not be flagged as a bad retarder. In some embodiments, the percentage ratio threshold may be a value above 50% but less than 100%.

In embodiments, a second speed differential rule may include a rule that determines that the status of a retarder is good when a median and/or average of the exit speed differences associated with the retarder is not outside of a range defined by plus or minus an average threshold. In embodiments, thresholding analysis manager 122 may apply this second speed differential rule against the set of exit speed differences to determine, for each retarder, the median and/or average of the exit speed differences associated with each retarder. Thresholding analysis manager 122 may then compare the median and/or average of the exit speed differences associated with each retarder with the range defined by plus or minus the average threshold. If, for a particular retarder, the median and/or average of the exit speed differences associated with the particular retarder is within the range defined by plus or minus the average threshold, thresholding analysis manager 122 may determine that the particular retarder has passed the second speed differential rule. On the other hand, if, for the particular retarder, the median and/or average of the exit speed differences associated with the particular retarder is outside the range defined by plus or minus the average threshold, thresholding analysis manager 122 may determine that the particular retarder has failed the second speed differential rule.

For example, an average threshold of 2 MPH may be specified for an application of the second speed differential rule. In this example, thresholding analysis manager 122 may determine, based on the set of exit speed differences, for a first retarder, the median and/or average of the exit speed differences associated with the first retarder. Thresholding analysis manager 122 may then compare the median and/or average of the exit speed differences associated with each retarder with the range defined by plus or minus the average threshold of 2 MPH (e.g., the range of [−2 MPH to 2 MPH]). In this example, if the median and/or average of the exit speed differences associated with the first retarder is between −2 MPH and 2 MPH, thresholding analysis manager 122 may determine that the first retarder passed the second speed differential rule. However, if the median and/or average of the exit speed differences associated with the first retarder is outside of −2 MPH to 2 MPH, thresholding analysis manager 122 may determine that the first retarder failed the second speed differential rule. Thresholding analysis manager 122 may continue applying the second speed differential rule to all retarders represented in the set of exit speed differences.

In embodiments, thresholding analysis manager 122 may apply the second speed differential rule to a retarder with a parameter that ensures that the result of the application of the second speed differential rule will be a percentage ratio, such that the retarder may be considered as a bad retarder by thresholding analysis manager 122 when the percentage ratio is at least 100%. In embodiments, a retarder may be determined to not fail the second differential rule, but the percentage ratio may be close to 100%, in which case, even though the retarder may not be flagged as a bad retarder, the retarder may be flagged as needing attention (e.g., using a "section warning" indication or a "warning" indication), as it may be close to becoming a bad retarder. In this manner, thresholding analysis manager 122 may be configured to determine "how close" a retarder may be to failing. In some embodiments a percentage ratio threshold may be used to determine to flag a retarder as needing attention (e.g., a warning) even though the retarder may not be flagged as a bad retarder. In some embodiments, the percentage ratio threshold may be a value above 50% but less than 100%.

In embodiments, a third speed differential rule may include a rule that determines that the status of a retarder is good when a defined middle percentage of the exit speed differences associated with the retarder are not spread over a spread range greater than a spread threshold. In embodiments, the defined middle percentage may be defined as a threshold and may include a range of exit speed difference defined by a top percentile threshold and a bottom percentile threshold. For example, a defined middle percentage may include a range of 50% of the exit speed differences associated with the retarder, and may be defined as the range between the bottom 25 percentile and the top 75 of data points. In embodiments, thresholding analysis manager 122 may apply this third speed differential rule against the set of exit speed differences to determine, for each retarder, the spread range of the defined middle percentage of exit speed differences associated with each retarder. For example, thresholding analysis manager 122 may determine, for each retarder, the difference between the lowest exit speed difference value in the exit speed differences within the defined middle percentage and the highest exit speed difference value in the exit speed differences within the defined middle percentage to determine the spread range of the defined middle percentage of exit speed differences associated with each retarder. Thresholding analysis manager 122 may then compare the spread range of the defined middle percentage of exit speed differences associated with each retarder with the spread threshold. If, for a particular retarder, the spread range of the defined middle percentage of exit speed differences associated with each retarder is less than the spread threshold, thresholding analysis manager 122 may determine that the particular retarder has passed the third speed differential rule. On the other hand, if, for the particular retarder, the spread range of the defined middle percentage of exit speed differences associated with each retarder is not less than the spread threshold, thresholding analysis manager 122 may determine that the particular retarder has failed the third speed differential rule.

For example, a spread threshold of 3 MPH may be specified for the third speed differential rule. In addition, a middle percentage that includes the bottom 25 percentile and the top 75 may be defined for the third speed differential rule. In embodiments, thresholding analysis manager 122 may apply this third speed differential rule against the set of exit speed differences and may identify exit speed differences associated with a retarder falling within the middle percentage of all the exit speed differences associated with the retarder. Analysis manager 122 may then determine a spread range of the exit speed differences within the middle percentage. For example, thresholding analysis manager 122 may determine, the difference between the lowest exit speed difference value within the middle percentage and the highest exit speed difference value within the defined middle percentage. Analysis manager 122 may determine the spread range of the middle percentage as the difference between the highest exit speed difference value and the lowest exit speed difference value. In this example, thresholding analysis manager 122 may compare the spread range of the middle percentage to the spread threshold of 3 MPH. In this example, if the spread range of the middle percentage is less than the spread threshold of 3 MPH, thresholding analysis manager 122 may determine that the first retarder passed the third speed differential rule. However, if the spread range of the middle percentage is not less than the spread threshold of 3 MPH, thresholding analysis manager 122 may determine that the first retarder failed the third speed differential rule. Thresholding analysis manager 122 may continue applying the third speed differential rule to all retarders represented in the set of exit speed differences.

In embodiments, thresholding analysis manager 122 may apply the third speed differential rule to a retarder with a parameter that ensures that the result of the application of the third speed differential rule will be a percentage ratio, such that the retarder may be considered as a bad retarder by thresholding analysis manager 122 when the percentage ratio is at least 100%. In embodiments, a retarder may be determined to not fail the third differential rule, but the percentage ratio may be close to 100%, in which case, even though the retarder may not be flagged as a bad retarder, the retarder may be flagged as needing attention (e.g., using a "section warning" indication or a "warning" indication), as it may be close to becoming a bad retarder. In this manner, thresholding analysis manager 122 may be configured to determine "how close" a retarder may be to failing. In some embodiments a percentage ratio threshold may be used to determine to flag a retarder as needing attention (e.g., a warning) even though the retarder may not be flagged as a bad retarder. In some embodiments, the percentage ratio threshold may be a value above 50% but less than 100%.

In embodiments, a fourth speed differential rule may include a weighted combination of the first, second, and third speed differential rules. In embodiments, thresholding analysis manager 122 may apply the fourth rule by combining the results of the first, second, and third speed differential rules in a weighted combination. The weighted combination may include applying a respective multiplier to the results of each of the first, second, and third speed differential rules. For example, weighted factors of 3, 2, and 2.25 may be configured for the results of the first, second, and third speed differential rules, respectively. In this example, thresholding analysis manager 122 may apply the respective weighted factor to each of the first, second, and third speed differential rules and may then sum the results to obtain a single result for the combination rule. In embodiments, applying the respective weighted factor to each of the first, second, and third speed differential rules may include raising each of the of the first, second, and third speed differential rules results by a power equal to the respective weighted factors. For example, in this example, the results of the first rule may be raised to a power of 3, the results of the second rule may be raised to a power of 2, and the results of the third rule may be raised to a power of 2.5. In this example, the results of each exponential operation may be summed to obtain an overall result for the fourth rule. In some embodiments, as the results of the first, second, and third speed differential rules may include a percentage value, the result of the combination rule (e.g., fourth speed differential rule) may also be a percentage value. It is noted that the particular weighted factors of 3, 2, and 2.25 are described by way of example and not intended to be limiting in any way. Indeed, in some embodiments, other weighted factors may be used. For example, in another particular example, weighted factors of 2, 3, and 1.1 may be configured for the results of the first, second, and third differential rules, respectively.

In embodiments, thresholding analysis manager 122 may determine a status of a retarder based on whether the retarder failed or passed each of the speed differential rules. For example, if a retarder failed any of the speed differential rules, the status of the retarder may be set as bad. On the other hand, if the retarder passed all applied speed differential rules, the status of the retarder may be set as good. In particular embodiments, a retarder may fail the fourth speed differential rule (e.g., the combination rule) if the retarder has failed any one of the individual rules in the combination (e.g., where the weighed factors are greater than one).

In embodiments, a second set of rules that may be applied in the thresholding analysis may include utilization per energy change rules that may be applied to $-\Delta E/\%$ U metrics associated with a retarder. The utilization per energy change rules may be applied to the set of $-\Delta E/\%$ U metrics generated by data compiler 121 and may be configured to determine the status of a retarder based on the rule application.

In embodiments, a first utilization per energy change rule may include a rule that determines that the status of a retarder is good when no more than a threshold percentage of $-\Delta E/\%$ U metrics associated with the retarder are below a threshold value of units. In embodiments, thresholding analysis manager 122 may apply this first utilization per energy change rule against the set of $-\Delta E/\%$ U metrics to determine, for each retarder, the percentage of $-\Delta E/\%$ U metrics associated with each retarder that are below the threshold value of units. Thresholding analysis manager 122 may then compare the percentage of $-\Delta E/\%$ U metrics associated with each retarder that are below the threshold value of units with the threshold percentage. If, for a particular retarder, the percentage of $-\Delta E/\%$ U metrics associated with each retarder that are below the threshold value of units is less than the threshold percentage, thresholding analysis manager 122 may determine that the particular retarder has passed the first utilization per energy change rule. On the other hand, if, for the particular retarder, the percentage of $-\Delta E/\%$ U metrics associated with each retarder that are below the threshold value of units is not less than the threshold percentage, thresholding analysis manager 122 may determine that the particular retarder has failed the first utilization per energy change rule.

For example, a threshold percentage of 75% and a threshold value of units of 8,500 units may be specified for the first utilization per energy change rule. In this example, thresholding analysis manager 122 may determine, based on the set of $-\Delta E/\%$ U metrics, for a first retarder, the percentage of $-\Delta E/\%$ U metrics associated with the first retarder that are below 8,500 units. Thresholding analysis manager 122 may then compare the percentage of $-\Delta E/\%$ U metrics associated with the first retarder that are below 8,500 units with the threshold percentage of 75%. In this example, if the percentage of $-\Delta E/\%$ U metrics associated with the first retarder that are below 8,500 units is less than 75%, thresholding analysis manager 122 may determine that the first retarder passed the first utilization per energy change rule. However, if the percentage of $-\Delta E/\%$ U metrics associated with the first retarder that are below 8,500 units is not less than 75%, thresholding analysis manager 122 may determine that the first retarder failed the first utilization per energy change rule. Thresholding analysis manager 122 may continue applying the first utilization per energy change rule to all retarders represented in the set of $-\Delta E/\%$ U metrics to determine whether each retarder passes or fails the first utilization per energy change rule.

In embodiments, thresholding analysis manager 122 may apply the first utilization per energy change rule to a retarder with a parameter that ensures that the result of the application will be a percentage ratio between the percentage of $-\Delta E/\%$ U metrics associated with the retarder that are below the threshold value of units and the parameter, such that the retarder may be considered as a bad retarder by thresholding analysis manager 122 when the percentage ratio is at least 100%. In these embodiments, the parameter may include a value by which the percentage of $-\Delta E/\%$ U metrics associated with the retarder that are below the threshold value of units is divided. For example, thresholding analysis manager 122 may calculate the percentage of $-\Delta E/\%$ U metrics associated with the retarder that are below the threshold value of units and may then divide the percentage by the parameter. The result may be a value configured to be 1 (or 100%) when the percentage of $-\Delta E/\%$ U metrics associated with the retarder that are below the threshold value of units is above the threshold percentage. In embodiments, a retarder may be determined to not fail the first utilization per energy change rule, but the percentage ratio may be close to 100%, in which case, even though the retarder may not be flagged as a bad retarder, the retarder may be flagged as needing attention (e.g., using a "section warning" indication or a "warning" indication), as it may be close to becoming a bad retarder. In this manner, thresholding analysis manager 122 may be configured to determine "how close" a retarder may be to failing. In some embodiments a percentage ratio threshold may be used to determine to flag a retarder as needing attention (e.g., a warning) even though the retarder may not be flagged as a bad retarder. In some embodiments, the percentage ratio threshold may be a value above 50% but less than 100%.

In embodiments, a second utilization per energy change rule may include a rule that determines that the status of a retarder is good when a defined middle percentage of the $-\Delta E/\%$ U metrics associated with the retarder are not spread over a spread range greater than a spread threshold. In embodiments, the defined middle percentage may be defined as a threshold and may include a range of $-\Delta E/\%$ U metrics defined by a top percentile threshold and a bottom percentile threshold. For example, a defined middle percentage may include a range of 50% of the $-\Delta E/\%$ U metrics associated with the retarder, and may be defined as the range between the bottom 25% percentile and the top 75%. In embodiments, thresholding analysis manager 122 may apply this second utilization per energy change rule against the set of $-\Delta E/\%$ U metrics to determine, for each retarder, the spread range of the defined middle percentage of $-\Delta E/\%$ U metrics associated with each retarder. For example, thresholding analysis manager 122 may determine, for each retarder, the difference between the lowest $-\Delta E/\%$ U metric value in the $-\Delta E/\%$ U metrics within the defined middle percentage and the highest $-\Delta E/\%$ U metric value in the $-\Delta E/\%$ U metrics within the defined middle percentage to determine the spread range of the defined middle percentage of $-\Delta E/\%$ U metrics associated with each retarder. Thresholding analysis manager 122 may then compare the spread range of the defined middle percentage of $-\Delta E/\%$ U metrics associated with each retarder with the spread threshold. If, for a particular retarder, the spread range of the defined middle percentage of $-\Delta E/\%$ U metrics associated with each retarder is less than the spread threshold, thresholding analysis manager 122 may determine that the particular retarder has passed the second utilization per energy change rule. On the other hand, if, for the particular retarder, the spread range of the defined middle percentage of $-\Delta E/\%$ U metrics associated with each retarder is not less than the spread threshold, thresholding analysis manager 122 may determine that the particular retarder has failed the second utilization per energy change rule.

For example, a spread threshold of 12,000 units may be specified for the second utilization per energy change rule. In addition, a middle percentage that includes the bottom 25% percentile and the top 75% may be defined for the second utilization per energy change rule. In embodiments, thresholding analysis manager 122 may apply this second utilization per energy change rule against the set of $-\Delta E/\%$ U metrics and may identify $-\Delta E/\%$ U metrics associated with a retarder falling within the middle percentage of all the $-\Delta E/\%$ U metrics associated with the retarder. Analysis manager 122 may then determine a spread range of the $-\Delta E/\%$ U metrics within the middle percentage. For example, thresholding analysis manager 122 may determine, the difference between the lowest $-\Delta E/\%$ U metric value within the middle percentage and the highest $-\Delta E/\%$ U metric value within the defined middle percentage. Analysis manager 122 may determine the spread range of the middle percentage as the difference between the highest $-\Delta E/\%$ U metric value and the lowest $-\Delta E/\%$ U metric value. In this example, thresholding analysis manager 122 may compare the spread range of the middle percentage to the spread threshold of 12,000 units. In this example, if the spread range of the middle percentage is less than 12,000 units, thresholding analysis manager 122 may determine that the first retarder passed the second utilization per energy change rule. However, if the spread range of the middle percentage is not less than 12,000 units, thresholding analysis manager 122 may determine that the first retarder failed the second utilization per energy change rule. Thresholding analysis manager 122 may continue applying the second utilization per energy change rule to all retarders represented in the set of $-\Delta E/\%$ U metrics to determine whether each retarder passes or fails the second utilization per energy change rule.

In embodiments, thresholding analysis manager 122 may apply the second utilization per energy change rule to a retarder with a parameter that ensures that the result of the application of the second utilization per energy change rule will be a percentage ratio, such that the retarder may be considered as a bad retarder by thresholding analysis manager 122 when the percentage ratio is at least 100%. In embodiments, a retarder may be determined to not fail the third differential rule, but the percentage ratio may be close to 100%, in which case, even though the retarder may not be flagged as a bad retarder, the retarder may be flagged as needing attention (e.g., using a "section warning" indication or a "warning" indication), as it may be close to becoming a bad retarder. In this manner, thresholding analysis manager 122 may be configured to determine "how close" a retarder may be to failing. In some embodiments a percentage ratio threshold may be used to determine to flag a retarder as needing attention (e.g., a warning) even though the retarder may not be flagged as a bad retarder. In some embodiments, the percentage ratio threshold may be a value above 50% but less than 100%.

In embodiments, thresholding analysis manager 122 may determine a status of a retarder based on whether the retarder failed or passed each of the utilization per energy change rules. For example, if a retarder failed any of the utilization per energy change rule rules, the status of the retarder may be set as bad. On the other hand, if the retarder passed all applied utilization per energy change rule rules, the status of the retarder may be set as good.

In some embodiments, the status of the retarder may include one of a plurality of status indicators. The status indicators in the plurality of status indicators may include status indicators of varying severity. In embodiments, a first status indicator may include an indication that a retarder is operating as expected and may include a "good retarder" indication. A second status indicator may include an indication that a retarder is not able to meet a requested exit speed and may include a "bad retarder" indication. This bad retarder indication may be used to cause a corrective action on the retarder. A third status indicator may include an indication that, although a retarder may be able to meet a requested exit speed, there is one or more sections within the retarder that may not be operating as expected and may require corrective action. In embodiments, other status indications may be used, and as such, the present description of three status indicators should not be construed as limiting in any way.

Results manager 123 may be configured to report the results of the thresholding analysis by thresholding analysis manager 122 and to generate, track, and/or control corrective actions performed in response to the determination of the status of retarders. For example, in some embodiments, results manager 123 may be configured to automatically generate a corrective action without operator intervention. In embodiments, results manager 123 may issue a notification to operators of the status of a retarder, in which case the operators may take corrective action. In some embodiments, results manager 123 may, in response to a determination that the status of a retarder is bad, send a control signal to the deactivate the retarder in order to avoid potential damage. In some embodiments, the control signal to the deactivate the retarder may include a signal to deactivate a specific retarder section (e.g., a retarder section determined to be bad), a control signal to adjust parameters of the specific retarder section, etc.

In embodiments, results manager 123 may be configured to generate and provide one or more status reports indicating the determined status of one or more retarders based on the thresholding analysis by thresholding analysis manager 122. In embodiments, the status report may be interactive and may allow an operator to modify entries on the report. Modified entries in the report may be detected by results manager 123, which may cause results manager 123 to store the modified entries in the respective configurations of the corresponding retarder. For example, in some embodiments, an operator may reset a status indicator flag of a retarder (e.g., after corrective action has been taken on the retarder) from a bad retarder or a section warning status indicator to a good retarder status indicator. In these cases, the configuration of the corresponding retarder may include an indication that the status flag for the retarder has been reset. In embodiments, car events associated with the retarder having a timestamp with a value before the time the status flag was reset may be scrubbed or removed from the database. In this manner, subsequent thresholding analysis performed for the retarder may only include car events after the status flag reset. The same process of removing car events associated with a retarder occurring prior to a status flag reset for the retarder may be performed every time the status flag for the retarder is reset. However, in embodiments, results manager 123 may determine that the status flag of a retarder found in a current thresholding analysis iteration to be a bad retarder or having a section warning has been reset a number of times before, and that the number of times exceeds a threshold number of times. In this case, results manager 123 may determine to include an indication indicating that there is a likelihood that the retarder is not actually bad, even though it has been found to be bad in the current thresholding analysis iteration, and there may be a possibility that the problem (e.g., the cause of the retarder being found to be a bad retarder) may be another device (e.g., a detector used to collect speed information associated with the retarder) or the prediction scheme used to determine the expected speeds at the retarder.

FIG. 4 illustrates an example of a UI presented to an operator to provide a status report associated with one or more retarders in accordance with aspects of the present disclosure. As can be seen in FIG. 4, UI 400 may be presented to an operator (e.g., via user terminal 130). In embodiments, UI 400 may include various graphical elements providing input/output functionality so that the operator may be presented with the results of the retarder status determination and may interact with system 100 such that feedback may be provided by the operator.

In embodiments, UI 400 may include a section 412 for including an indication of the number of retarder failures (e.g., the number of retarders whose status was determined as bad) included in the report. UI 400 may also include a section 410 for including an indication of the number of sections warnings (e.g., the number of retarder sections found to require attention) included in the report.

As illustrated in FIG. 4, the report presented in FIG. 4 may identify several retarders as bad. For example, in this example, a combination rule was applied against retarder 414, and the result was 105%, indicating that retarder 414 was bad. In this example, the combination rule was applied against retarder 416, and the result was 86%, not greater than 100%, indicating that although retarder 414 is not bad, it is degraded and may be close to becoming a bad retarder. In this example, the combination rule was applied against retarder 418, and the result of the retarder was 80%, indicating that the detector is good. However, the results of the utilization per energy change analysis on retarder 418 also indicate that at least one section of retarder 418 (e.g., the second section) may be closed to being outside acceptable parameters. In this example, even though the second section of retarder may not have failed, it may be closed to failing.

Figure 5:
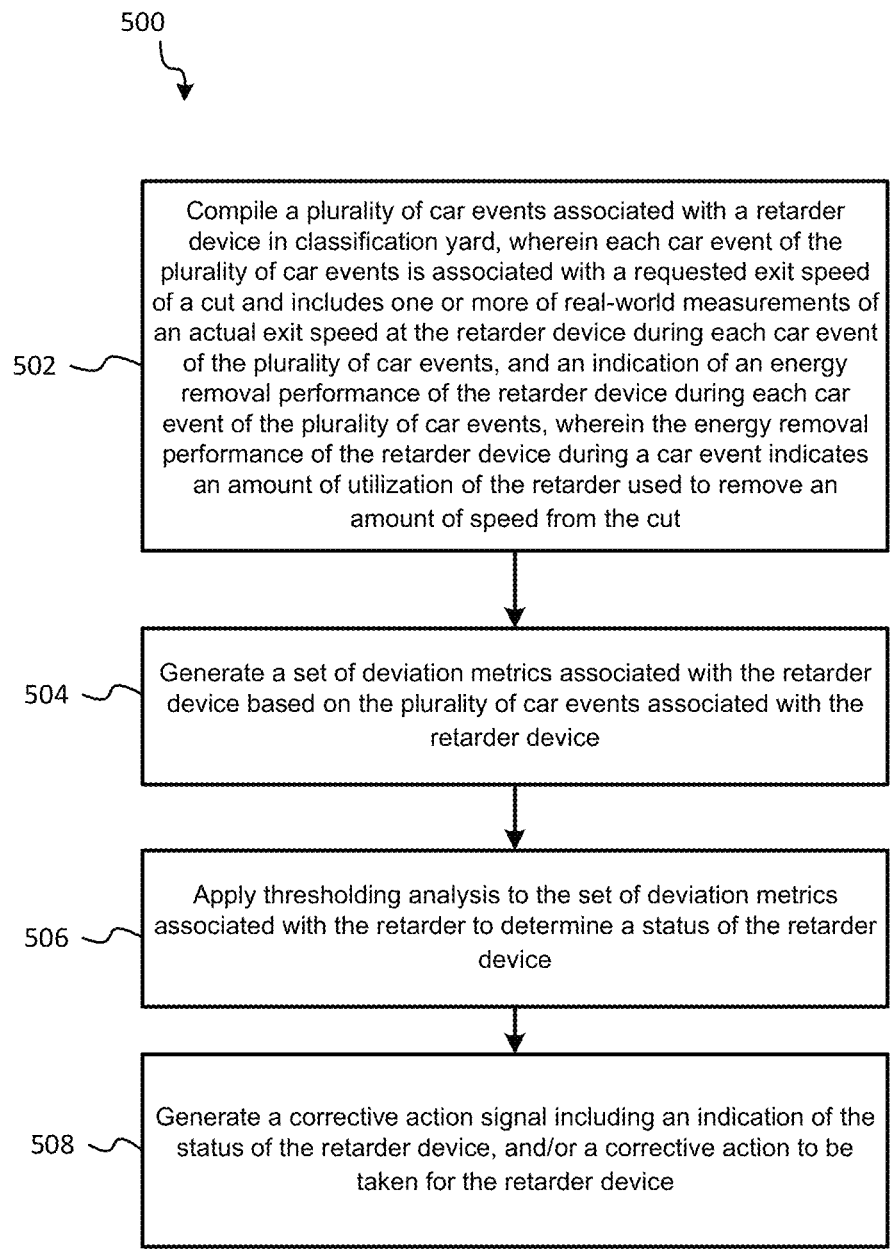
FIG. 5 shows a high-level flow diagram of operation of a system for determining a status of retarder devices in a classification yard in accordance with embodiments of the present disclosure.

FIG. 5 shows a high-level flow diagram 500 of operation of a system configured in accordance with embodiments of the present disclosure for determining a status of retarder devices in a classification yard. For example, the functions illustrated in the example blocks shown in FIG. 5 may be performed by system 100 of FIG. 1 according to embodiments herein. In embodiments, the operations of the method 500 may be stored as instructions that, when executed by one or more processors, cause the one or more processors to perform the operations of the method 500.

At block 502, a plurality of car events associated with a retarder device in classification yard may be compiled. In embodiments, each car event of the plurality of car events may be associated with a requested exit speed of a cut and may include real-world measurements of an actual exit speed at the retarder device during each car event of the plurality of car events and/or an indication of an energy removal performance of the retarder device during each car event of the plurality of car events. In embodiments, the energy removal performance of the retarder device during a car event may indicate an amount of utilization of the retarder used to remove an amount of speed from the cut. In embodiment, functionality of a data compiler (e.g., data compiler 121 in FIG. 1) may be used to compile a plurality of car events associated with a retarder device in classification yard. In embodiments, the data compiler may perform operations to compile a plurality of car events associated with a retarder device in classification yard according to operations and functionality as described above with reference to data compiler 121 and as illustrated in FIGS. 1-4.

At block 504, a set of deviation metrics associated with the retarder device is generated based on the plurality of car events associated with the retarder device. In embodiment, functionality of a data compiler (e.g., data compiler 121 in FIG. 1) may be used to generate the set of deviation metrics associated with the retarder device based on the plurality of car events associated with the retarder device. In embodiments, the data compiler may perform operations to generate the set of deviation metrics associated with the retarder device based on the plurality of car events associated with the retarder device according to operations and functionality as described above with reference to data compiler 121 and as illustrated in FIGS. 1-4.

At block 506, thresholding analysis is applied to the set of deviation metrics associated with the retarder to determine a status of the retarder device. In embodiment, functionality of a threshold analysis manager (e.g., threshold analysis manager 122 in FIG. 1) may be used to apply thresholding analysis to the set of deviation metrics associated with the retarder to determine a status of the retarder device. In embodiments, the threshold analysis manager may perform operations to apply thresholding analysis to the set of deviation metrics associated with the retarder to determine a status of the retarder device according to operations and functionality as described above with reference to threshold analysis manager 122 and as illustrated in FIGS. 1-4.

At block 508, a corrective action signal including an indication of the status of the retarder device and/or a corrective action to be taken for the retarder device is generated. In embodiment, functionality of a results manager (e.g., results manager 123 in FIG. 1) may be used to generate a corrective action signal including an indication of the status of the retarder device and/or a corrective action to be taken for the retarder device. In embodiments, the results manager may perform operations to generate a corrective action signal including an indication of the status of the retarder device and/or a corrective action to be taken for the retarder device according to operations and functionality as described above with reference to results manager 123 and as illustrated in FIGS. 1-4.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules in FIGS. 1-5 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of determining a status of retarder devices in a classification yard, comprising:
    compiling a plurality of car events associated with a retarder device in the classification yard, wherein each car event of the plurality of car events is associated with a requested exit speed of a cut and includes one or more of:
        real-world measurements of an actual exit speed at the retarder device during each car event of the plurality of car events; and
        an indication of an energy removal performance of the retarder device during each car event of the plurality of car events, wherein the energy removal performance of the retarder device during a car event indicates an amount of utilization of the retarder used to remove an amount of speed from the cut;
    generating a set of deviation metrics associated with the retarder device based on the plurality of car events associated with the retarder device;
    applying thresholding analysis to the set of deviation metrics associated with the retarder to determine a status of the retarder device; and
    generating a corrective action signal including one or more of:
        an indication of the status of the retarder device; and
        a corrective action to be taken on the retarder device.

2. The method of claim 1, wherein generating the set of deviation metrics associated with the retarder device includes generating one or more of:
    a set of exit speed differences associated with the retarder device; and
    a set of change in speed per utilization percentage ($-\Delta E/\% U$) metrics associated with the retarder device.

3. The method of claim 2, wherein generating the set of exit speed differences associated with the retarder device includes:
    calculating, for each car event in the plurality of car events associated with a retarder device, an exit speed difference by calculating a difference between a requested exit speed associated with a respective car event and the actual exit speed measured at the retarder device during the respective car event; and
    aggregating each calculated exit speed difference for each car event into the set of exit speed differences associated with the retarder device.

4. The method of claim 3, wherein applying thresholding analysis to the set of deviation metrics associated with the retarder device includes applying one or more of a set of speed differential rules to the set of exit speed differences associated with the retarder device, wherein the set of speed differential rules includes one or more of:
    a first speed differential rule specifying that the status of the retarder device is based on whether a threshold percentage of the set of exit speed differences associated with the retarder device is outside a range defined by plus or minus a speed threshold;
    a second speed differential rule specifying that the status of the retarder device is based on whether a median or average of the set of exit speed differences associated with the retarder device is within a range defined by plus or minus an average threshold;
    a third speed differential rule specifying that the status of the retarder device is based on whether a spread range of exit speed differences values within a middle percentage of the set of exit speed differences associated with the retarder device is less than a spread threshold, wherein the middle percentage of the set of exit speed differences is defined by a range of exit speed differences values including a top percentile threshold of the exit speed differences values in the set of exit speed differences and a bottom percentile threshold of the exit speed differences values in the set of exit speed differences; and
    a combination speed differential rule that includes a weighted combination of the results of one or more of the first speed differential rule, the second speed differential rule, and the third speed differential rule.

5. The method of claim 2, wherein generating the set of $-\Delta E/\% U$ metrics associated with the retarder device includes:
    calculating, for each car event in the plurality of car events associated with a retarder device, a $-\Delta E/\% U$ metric; and
    aggregating each calculated $-\Delta E/\% U$ metric for each car event into the set of $-\Delta E/\% U$ metrics associated with the retarder device.

6. The method of claim 5, wherein applying thresholding analysis to the set of deviation metrics associated with the retarder device includes applying one or more of a set of utilization per energy change rules to the set of $-\Delta E/\%$ U metrics associated with the retarder device, wherein the set of utilization per energy change rules includes one or more of:
 a first utilization per energy change rule specifying that the status of the retarder device is based on whether a threshold percentage of the set of $-\Delta E/\%$ U metrics associated with the retarder device is below a threshold value of units; and
 a second utilization per energy change rule specifying that the status of the retarder device is based on whether a spread range of $-\Delta E/\%$ U metrics values within a middle percentage of the set of $-\Delta E/\%$ U metrics associated with the retarder device is less than a spread threshold, wherein the middle percentage of the set of $-\Delta E/\%$ U metrics is defined by a range of $-\Delta E/\%$ U metrics values including a top percentile threshold of the $-\Delta E/\%$ U metrics values in the set of $-\Delta E/\%$ U metrics and a bottom percentile threshold of the $-\Delta E/\%$ U metrics values in the set of $-\Delta E/\%$ U metrics.

7. The method of claim 1, wherein applying the thresholding analysis to the set of deviation metrics associated with the retarder device to determine the status of the retarder device includes:
 obtaining a percentage result for the retarder device, the percentage result indicating a percentage status of the retarder device.

8. The method of claim 7, wherein determining the status of the retarder device includes flagging a status flag of the retarder device with one or more of:
 a bad status indication when the percentage status of the retarder device is at least 100%;
 a warning status indication when the percentage status of the retarder device is greater than a threshold percentage and less than 100%;
 a good status indication when the percentage status of the retarder device is less than the threshold percentage.

9. The method of claim 8, wherein the warning status indication includes a section warning indication identifying a section of the retarder device determined to have failed the thresholding analysis.

10. The method of claim 1, further comprising:
 identifying that the indication of the status of the retarder device found to be bad has previously been reset a number of times;
 determining that the number of times exceeds a threshold amount; and
 flagging the retarder device as a potential misidentification of a bad retarder device.

11. A system for determining a status of retarder devices in a classification yard, comprising:
 at least one processor; and
 a memory operably coupled to the at least one processor and storing processor-readable code that, when executed by the at least one processor, is configured to perform operations including:
  compiling a plurality of car events associated with a retarder device in the classification yard, wherein each car event of the plurality of car events is associated with a requested exit speed of a cut and includes one or more of:
   real-world measurements of an actual exit speed at the retarder device during each car event of the plurality of car events; and
   an indication of an energy removal performance of the retarder device during each car event of the plurality of car events, wherein the energy removal performance of the retarder device during a car event indicates an amount of utilization of the retarder device used to remove an amount of speed from the cut;
  generating a set of deviation metrics associated with the retarder device based on the plurality of car events associated with the retarder device;
  applying thresholding analysis to the set of deviation metrics associated with the retarder device to determine a status of the retarder device; and
  generating a corrective action signal including one or more of:
   an indication of the status of the retarder device; and
   a corrective action to be taken for the retarder device.

12. The system of claim 11, wherein generating the set of deviation metrics associated with the retarder device includes generating one or more of:
 a set of exit speed differences associated with the retarder device; and
 a set of change in speed per utilization percentage ($-\Delta E/\%$ U) metrics associated with the retarder device.

13. The system of claim 12, wherein generating the set of exit speed differences associated with the retarder device includes:
 calculating, for each car event in the plurality of car events associated with a retarder device, an exit speed difference by calculating a difference between a requested exit speed associated with a respective car event and the actual exit speed measured at the retarder device during the respective car event; and
 aggregating each calculated exit speed difference for each car event into the set of exit speed differences associated with the retarder device.

14. The system of claim 13, wherein applying thresholding analysis to the set of deviation metrics associated with the retarder device includes applying one or more of a set of speed differential rules to the set of exit speed differences associated with the retarder device, wherein the set of speed differential rules includes one or more of:
 a first speed differential rule specifying that the status of the retarder device is based on whether a threshold percentage of the set of exit speed differences associated with the retarder device is outside a range defined by plus or minus a speed threshold;
 a second speed differential rule specifying that the status of the retarder device is based on whether a median or average of the set of exit speed differences associated with the retarder device is within a range defined by plus or minus an average threshold;
 a third speed differential rule specifying that the status of the retarder device is based on whether a spread range of exit speed differences values within a middle percentage of the set of exit speed differences associated with the retarder device is less than a spread threshold, wherein the middle percentage of the set of exit speed differences is defined by a range of exit speed differences values including a top percentile threshold of the exit speed differences values in the set of exit speed differences and a bottom percentile threshold of the exit speed differences values in the set of exit speed differences; and
 a combination speed differential rule that includes a weighted combination of the results of one or more of the first speed differential rule, the second speed differential rule, and the third speed differential rule.

15. The system of claim 12, wherein generating the set of $-\Delta E/\%$ U metrics associated with the retarder device includes:
- calculating, for each car event in the plurality of car events associated with a retarder device, a $-\Delta E/\%$ U metric; and
- aggregating each calculated $-\Delta E/\%$ U metric for each car event into the set of $-\Delta E/\%$ U metrics associated with the retarder device.

16. The system of claim 15, wherein applying thresholding analysis to the set of deviation metrics associated with the retarder device includes applying one or more of a set of utilization per energy change rules to the set of $-\Delta E/\%$ U metrics associated with the retarder device, wherein the set of utilization per energy change rules includes one or more of:
- a first utilization per energy change rule specifying that the status of the retarder device is based on whether a threshold percentage of the set of $-\Delta E/\%$ U metrics associated with the retarder device is below a threshold value of units; and
- a second utilization per energy change rule specifying that the status of the retarder device is based on whether a spread range of $-\Delta E/\%$ U metrics values within a middle percentage of the set of $-\Delta E/\%$ U metrics associated with the retarder device is less than a spread threshold, wherein the middle percentage of the set of $-\Delta E/\%$ U metrics is defined by a range of $-\Delta E/\%$ U metrics values including a top percentile threshold of the $-\Delta E/\%$ U metrics values in the set of $-\Delta E/\%$ U metrics and a bottom percentile threshold of the $-\Delta E/\%$ U metrics values in the set of $-\Delta E/\%$ U metrics.

17. The system of claim 11, wherein applying the thresholding analysis to the set of deviation metrics associated with the retarder device to determine the status of the retarder device includes:
- obtaining a percentage result for the retarder device, the percentage result indicating a percentage status of the retarder device.

18. The system of claim 17, wherein determining the status of the retarder device includes flagging a status flag of the retarder device with one or more of:
- a bad status indication when the percentage status of the retarder device is at least 100%;
- a warning status indication when the percentage status of the retarder device is greater than a threshold percentage and less than 100%;
- a good status indication when the percentage status of the retarder device is less than the threshold percentage.

19. The system of claim 11, wherein the operations further comprise:
- identifying that the indication of the status of the retarder device found to be bad has previously been reset a number of times;
- determining that the number of times exceeds a threshold amount; and
- flagging the retarder device as a potential misidentification of a bad retarder device.

20. A computer-based tool for determining a status of retarder devices in a classification yard, the computer-based tool including non-transitory computer readable media having stored thereon computer code which, when executed by a processor, causes a computing device to perform operations comprising:
- compiling a plurality of car events associated with a retarder device in the classification yard, wherein each car event of the plurality of car events is associated with a requested exit speed of a cut and includes one or more of:
  - real-world measurements of an actual exit speed at the retarder device during each car event of the plurality of car events; and
  - an indication of an energy removal performance of the retarder device during each car event of the plurality of car events, wherein the energy removal performance of the retarder device during a car event indicates an amount of utilization of the retarder device used to remove an amount of speed from the cut;
- generating a set of deviation metrics associated with the retarder device based on the plurality of car events associated with the retarder device;
- applying thresholding analysis to the set of deviation metrics associated with the retarder device to determine a status of the retarder device; and
- generating a corrective action signal including one or more of:
  - an indication of the status of the retarder device; and
  - a corrective action to be taken for the retarder device.

* * * * *